(12) United States Patent
Yamakawa et al.

(10) Patent No.: US 7,716,337 B2
(45) Date of Patent: May 11, 2010

(54) INTERMEDIATE DEVICE WHICH CAN BE INTRODUCED AND REMOVED IN SEAMLESS WAY

(75) Inventors: Satoshi Yamakawa, Tokyo (JP); Takashi Torii, Tokyo (JP); Wataru Katsurashima, Tokyo (JP)

(73) Assignee: NEC Corporation, Tokyo (JP)

( * ) Notice: Subject to any disclaimer, the term of this patent is extended or adjusted under 35 U.S.C. 154(b) by 99 days.

(21) Appl. No.: 10/599,047

(22) PCT Filed: Nov. 15, 2004

(86) PCT No.: PCT/JP2004/016947
§ 371 (c)(1),
(2), (4) Date: Sep. 18, 2006

(87) PCT Pub. No.: WO2005/091151
PCT Pub. Date: Sep. 29, 2005

(65) Prior Publication Data
US 2007/0192494 A1 Aug. 16, 2007

(30) Foreign Application Priority Data
Mar. 19, 2004 (JP) ............................. 2004-080337

(51) Int. Cl.
*G06F 15/16* (2006.01)
*G06F 15/173* (2006.01)
(52) U.S. Cl. ...................... 709/227; 709/223; 709/244
(58) Field of Classification Search .................. 709/227
See application file for complete search history.

(56) References Cited

U.S. PATENT DOCUMENTS

| | | | |
|---|---|---|---|
| 6,108,701 A * | 8/2000 | Davies et al. | 709/224 |
| 6,446,200 B1 * | 9/2002 | Ball et al. | 713/1 |
| 6,601,101 B1 * | 7/2003 | Lee et al. | 709/227 |
| 6,807,581 B1 * | 10/2004 | Starr et al. | 709/250 |
| 6,826,613 B1 * | 11/2004 | Wang et al. | 709/227 |
| 7,171,452 B1 * | 1/2007 | Gole | 709/212 |
| 7,254,611 B1 * | 8/2007 | Clark et al. | 709/204 |

FOREIGN PATENT DOCUMENTS

JP 06-326724 11/1994

(Continued)

OTHER PUBLICATIONS

Wataru Katsurashima, et al., "NAS Switch: A Novel CIFS Server Virtualization," Processings of 12th IEEE/11th NASA Goddard Conference on Mass Storage Systems & Technologies (Apr. 2003), NEC Software Kyushu, Ltd.

*Primary Examiner*—Moustafa M Meky
*Assistant Examiner*—Blake Rubin
(74) *Attorney, Agent, or Firm*—Dickstein, Shapiro, LLP.

(57) ABSTRACT

An intermediate device which can be introduced and removed in seamless way is disclosed. The state information acquiring means acquires state information required to maintain the state of a session established between the first information processing device and the second information processing device for the information processing service, from the first information processing device or the second information processing device. The intermediate service managing means generates, based on the state information, transfer rules for applying the intermediate service to data of the information processing service, and transferring the data to which the intermediate service is applied. The transfer control means maintains the state of the existing session between itself and the second information processing device, establishes a new session between itself and the first information processing device, and transfers the data using the existing session and the new session, according to the transfer rules.

23 Claims, 10 Drawing Sheets

FOREIGN PATENT DOCUMENTS

| | | |
|---|---|---|
| JP | 2000-132479 | 5/2000 |
| JP | 2002-176432 | 6/2002 |
| JP | 2002-344495 | 11/2002 |
| JP | 2003-036243 | 2/2003 |
| JP | 2003-087330 | 3/2003 |
| JP | 2003-203029 | 7/2003 |

* cited by examiner

INTERMEDIATE DEVICE WHICH CAN BE INTRODUCED AND REMOVED IN SEAMLESS WAY

TECHNICAL FIELD

The present invention relates to an intermediate device for being logically inserted into a network between information processing apparatus typified by a client and a server, and more particularly to an intermediate device for providing a new service which expands the services already available from information processing apparatus in an environment wherein the information processing apparatus temporarily hold information inherent in communications and communicate with each other using such information.

BACKGROUND ART

A plurality of information processing apparatus communicate with each other through a network to provide services between the information processing apparatus.

For example, in a client/server system, a client and a server communicate with each other so that the server provides a service and the client uses the service.

The client/server system occasionally has service providing architectures changed to improve services provided by servers, to associate servers with each other to provide a service of a certain type, and to transfer a service provided by a server to another server. An intermediate device is employed to change service providing architectures.

A peer-to-peer system comprises a plurality of information processing apparatus called peers. A peer is not assigned a fixed role as a client or a server, but has its role changed depending on the situation. As with the client/server system, the peer-to-peer system has peers communicating with each other so that a peer provides a service and another peer uses the service. The peer-to-peer system also needs to change service providing architectures, and an intermediate device is employed to change service providing architectures.

In order to realize services in these systems, the systems may employ a communication protocol having a procedure for information processing apparatus to exchange and hold state information inherent in communication sessions and to communicate with each other using the state information.

A typical system wherein a client and a server exchange and hold inherent state information for a certain period of time, and communicate with each other using the state information, employs a protocol as a de facto standard such as NFS (Network File System) or CIFS (Common Internet File System).

These communication protocols are used for remote file access for accessing storage resources of a server from a client. Using such a communication protocol, the client can easily use the storage resources of the server as if accessing storage resources within itself (see Japanese laid-open patent publication No. 2003-203029 and W. Katsurashima, S. Yamakawa, T. Torii, J. Ishikawa, Y. Kikuchi, K. Yamaguti, K. Fujii and T. Nakashima, "NAS Switch: A Novel CIFS Server Virtualization," Processings of 12th IEEE/11th NASA Goddard Conference on Mass Storage Systems & Technologies, April, 2003).

Japanese laid-open patent publication No. 2003-203029 proposes a process of integrating storage resources of a plurality of servers as if they are a single storage resource and providing it to a client in an NFS protocol environment. According to the proposed process, a switch device for changing and transferring information in communication packets is introduced between a client and a server for thereby providing storage resources of a plurality of servers as if they are a single storage resource to the client without the need for special software or hardware introduced into the client and the server.

The article by W. Katsurashima, et al. proposes a switch apparatus for integrating storage resources of a plurality of servers without the need for special software or hardware introduced into a client and a server in an environment employing a CIFS protocol as with the NFS protocol environment.

According to the above proposals, services provided by a group of servers that do not have an interlinking function can be integrated by providing an intermediate device typified by a switch apparatus in a network between a client and servers. Therefore, the client or the user of the client can easily use services provided by the servers without concern over the architecture of the server group. The system administrator can perform maintenance work for adding or removing a server or transferring resources between servers without changing client settings and stopping applications depending on the operating situation of the system and the services. Another typical system wherein a client and a server exchange and hold inherent state information for a certain period of time, and communicate with each other using the state information, employs HTTP (Hyper Text Transfer Protocol). According to the HTTP, the client can use Web contents stored in the server. The client requests the server for the Web contents, and the server provides the Web contents to the server. An intermediate device having a function to distribute requests from the client to appropriate servers is called a Web switch or a layer 7 switch.

The intermediate device of the above type distributes requests depending on the locations where Web contents are stored, thereby integrating a plurality of servers to make them look like one Web server to clients. Therefore, if Web servers are classified according to differently processed Web services such as contents using CGI and contents using COOKIE, then processing loads based on requests from clients can be distributed, and servers having capabilities that match the processing loads can be installed as respective Web servers for performing distributed processes. Consequently, Web services themselves can stably be run by efficiently constructing systems at Web sites and changing systems depending on the changing situation.

Services that are provided by an intermediate device, such as services for distributing remote file access from a client to a plurality of servers and services for distributing Web service access from a client to a plurality of Web servers, will hereinafter referred to as intermediate device provided services.

DISCLOSURE OF THE INVENTION

In a system using the above intermediate device, it is preferable that the intermediate device be installed between clients and servers, destinations to be accessed by clients be set as the intermediate device, and clients start communications through the intermediate device. According to such system configurations, server systems can be changed and resource allocations can be changed without changing client settings and stopping applications.

However, such changes may not necessarily be possible in some cases. For example, if an intermediate device is to be newly introduced when a certain service has been started between a client and a server, then it is necessary to temporarily stop applications and change client settings in order to change the server system and change resource allocations. A client and a server communicate with each other while exchanging and holing inherent state information of each other. For newly introducing an intermediate device which provide services, it is necessary to temporarily stop applications on the client thereby cutting off communications between the server and the client, and then change the destination to be connected by the client from the server to the intermediate device.

For removing an intermediate device connected between a client and a server, it is also necessary to temporarily stop applications run on the client thereby cutting off communications between the server and the client, and then change the destination to be connected by the client from the intermediate device to the server, as when the intermediate device is to be introduced. Removing an intermediate device may be replacing the intermediate device or getting rid of the intermediate device which has been used for a temporary application. A temporary application may be to replace an existing server or to use an intermediate application temporarily for integrating services provided by a plurality of servers into services on a single server.

It is an object of the present invention to provide an intermediate device which can seamlessly be newly introduced and removed without stopping applications run on a client or changing settings of a destination to be connected by a client.

To achieve the above object, an intermediate device according to the present invention is adapted to be provided between a first information processing device for providing an information processing service through a network and a second information processing device for receiving the information processing service, for providing an intermediate service additional to the information processing service. The intermediate device has a state information acquiring means, an intermediate service managing means, and a transfer control means.

The state information acquiring means acquires state information required to maintain the state of a session established between the first information processing device and the second information processing device for the information processing service, from the first information processing device or the second information processing device.

The intermediate service managing means generates, based on the state information, transfer rules for applying the intermediate service to data of the information processing service which is sent and received between the first information processing device and the second information processing device, and transferring the data to which the intermediate service is applied.

The transfer control means maintains the state of the existing session established between the first information processing device and the second information processing device, between itself and the second information processing device, establishes a new session between itself and the first information processing device, and transfers the data using the existing session and the new session, according to the transfer rules.

BEST MODE FOR CARRYING OUT THE INVENTION

Embodiments of the present invention will be described in detail below with reference to the drawings.

Figure 1:
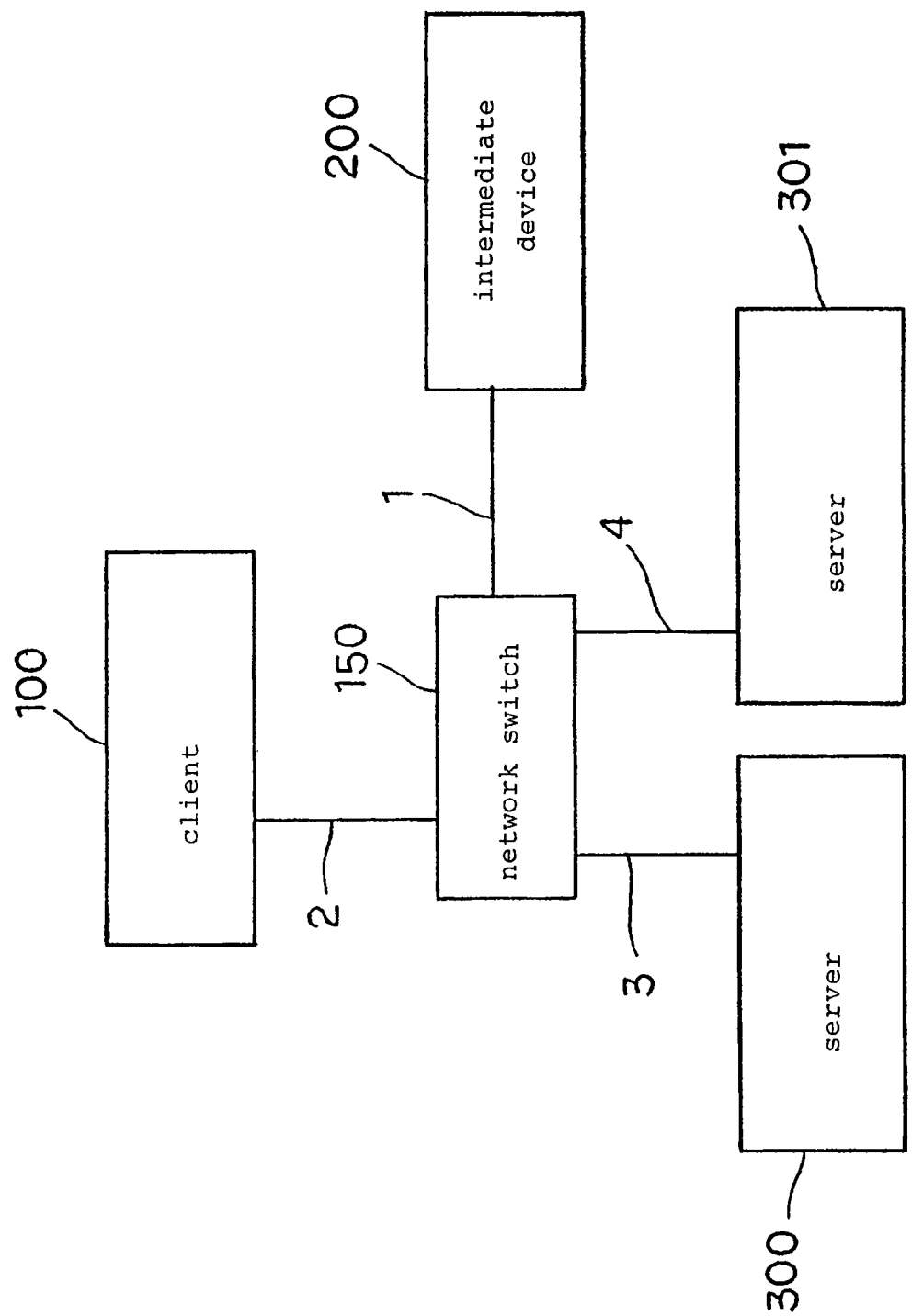
FIG. 1 is a block diagram showing an arrangement of a system according to an embodiment of the present invention.

FIG. 1 is a block diagram showing an arrangement of a system according to an embodiment of the present invention. As shown in FIG. 1, the system has client 100, intermediate device 200, servers 300, 301, and network switch 150. Although one or two units of each device are illustrated in FIG. 1, the number of units of each device is optional.

Each of client 100, intermediate device 200, and servers 300, 301 has an interface for network connections in order to communicate with other devices. Intermediate device 200 is connected to network 1, client 100 to network 2, server 300 to network 3, and server 301 to network 4. Networks 1 through 4 are connected to respective ports of network switch 150. This configuration of the system allows client 100, intermediate device 200, and servers 300, 301 to communicate with each other.

The network configuration shown in FIG. 1 is illustrated by way of example only, and the present invention is not limited thereto. Intermediate device 200 may be installed at least logically between client 100 and servers 300, 301, and may be installed physically between client 100 and servers 300, 301.

Servers 300, 301 can provide a service for allowing client 100 to make use of WEB pages through the networks or an information processing service including a service for allowing client 100 to access file data. The service provided by the servers will hereinafter be referred to as "information processing service".

Client 100 can access servers 300, 301 and use the information processing service provided by servers 300, 301.

Network switch 150 has a function to transfer communication packets between the ports and also a function to copy and transfer communication packets, typically known as port mirroring. Port mirroring is a function for transferring communication packets transferred to a certain route also to another route.

Figure 2:
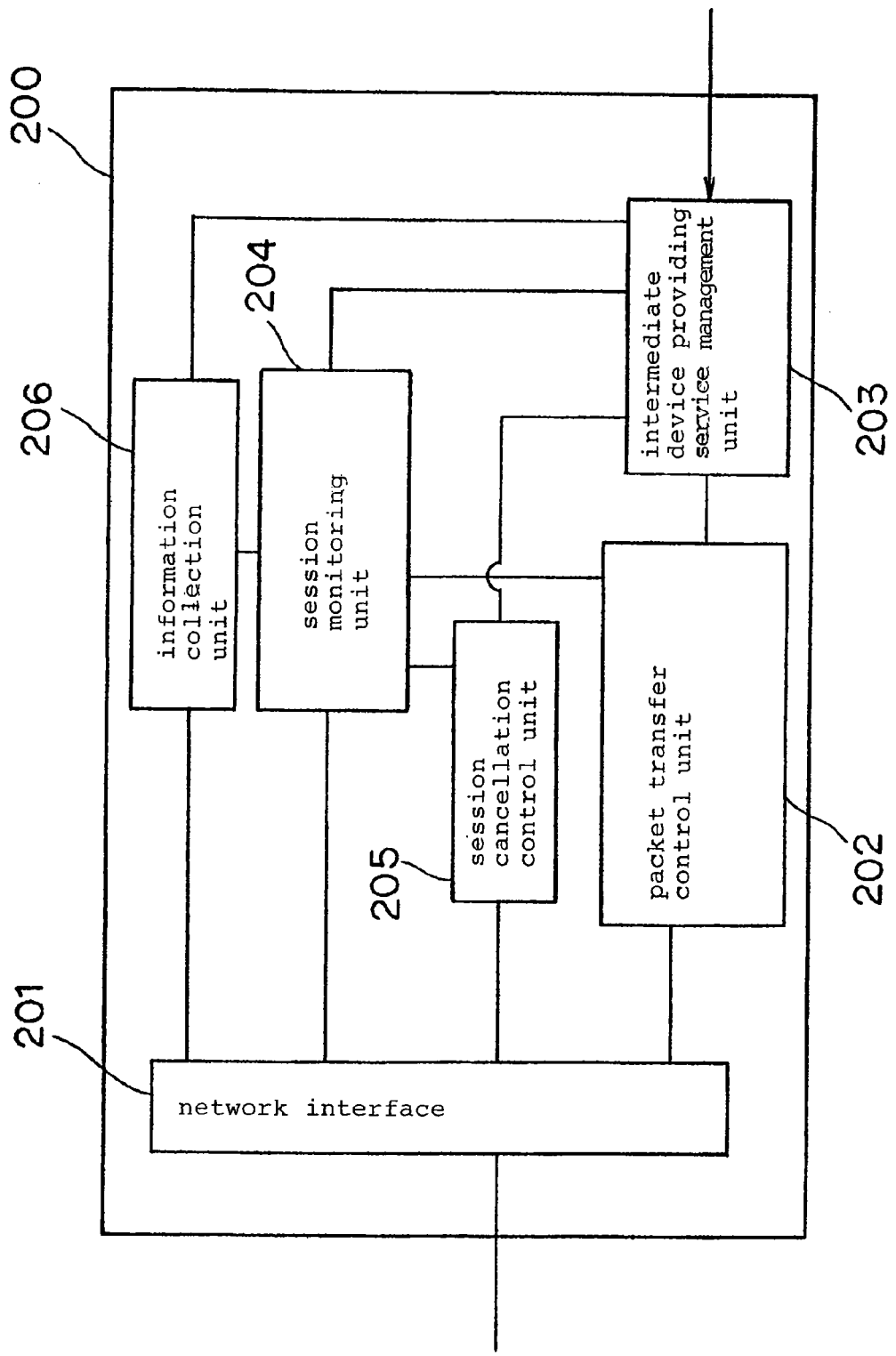
FIG. 2 is a block diagram showing an arrangement of an intermediate device.

Intermediate device 200 is installed between clients 100 and servers 300, 301, and provides an additional service for transferring communication packets therebetween and enhancing the information processing service provided by the servers. FIG. 2 is a block diagram showing an arrangement of intermediate device 200.

As shown in FIG. 2, intermediate device 200 comprises network interface 201, packet transfer control unit 202, intermediate device providing service management unit 203, session monitoring unit 204, session cancellation control unit 205, and information collecting unit 206.

Packet transfer control unit 202 reconfigures packets or recombines headers, and transfers the data between client 100 and servers 300, 301. The transfer process that is performed by packet transfer control unit 202 is determined by a protocol handled by the intermediate device, services provided by the intermediate device (hereinafter referred to as "intermediate device providing services"), and settings that have been made by the operator for the intermediate device providing services. The intermediate device providing services that the present invention handles include services of various contents.

The contents of the intermediate device providing services may be set by the operator. Examples of operation will be given below. If no intermediate device providing services are provided, then packet transfer control unit 202 only transfers packets between client 100 and servers 300, 301. If the intermediate device providing services are provided, then packet transfer control unit 202 transfers packets between client 100 and servers 300, 301 according to the transfer rules thereof. At this time, packet transfer control unit 202 may change the headers of communication packets and transfer the data, or may extract data sent with communication packets and transfer the extracted data with new communication packets. The intermediate device providing services are additional services that are provided by servers 300, 301 for the information processing service, and are provided by intermediate device 200. The transfer destination to which the data are transferred may not necessarily be the same as a transmission destination specified by the transmission source.

The intermediate device providing services are realized by intermediate device 200 when it manipulates the transfer destination of data between client 100 and servers 300, 301, the header, or the data. Therefore, certain transfer rules are necessary to provide the intermediate device providing services. The transfer rules represent regulations with respect to data transfer for realizing the transfer process that is determined as described above. An example of the intermediate device providing services is a service for controlling intermediate device 200 to distribute accesses from client 100 appropriately to a plurality of servers 300, 301 for thereby integrating the plurality of servers 300, 301 as it they look like a single server to client 100.

Intermediate device providing service management unit 203 controls the providing of the intermediate device providing services. Specifically, intermediate device providing service management unit 203 determines a process to be performed by packet transfer control unit 202, session monitoring unit 204, session cancellation control unit 205, or information collecting unit 206, based on the settings made by the operator for the intermediate device providing services, and instructs the unit to perform the process. For example, intermediate device providing service management unit 203 determines transfer rules based on the information collected by session monitoring unit 204 and information collecting unit 206 and the settings made by the operator, and instructs packet transfer control unit 202 to transfer data according to the transfer rules.

Session monitoring unit 204 monitors the state of a session established between client 100 and servers 300, 301, and collects session information required to start the intermediate device providing services from data that are exchanged in the session. The session information refers to inherent state information relative to the session of each communication, and is effective with respect to the session only during a period in which the session is established. If intermediate device 200 is introduced seamlessly between server 300 and client 100 and starts the intermediate device providing services, intermediate device 200 maintains the state of a session that has been maintained between server 300 and client 100 so far. Therefore, the intermediate device needs to acquire state information required to maintain the state of the session.

If intermediate device 200 handles a protocol having a function to initialize sessions, then session cancellation control unit 205 can send a command to client 100 and servers 300, 301 for initializing the session that has already been established therebetween. For example, session cancellation control unit 205 may send a command for forcibly nullifying the session. When client 100 and servers 300, 301 execute the command, the session is nullified. Initializing a session refers to nullifying the existing session and reestablishing a new session that takes over the state of the existing session.

Information collecting unit 206 collects service inherent information required to start the intermediate device providing services seamlessly from client 100 and servers 300, 301 through the networks, and sends the service inherent information together with the session information collected by session monitoring unit 204 to intermediate device providing service management unit 203. The service inherent information refers to state information inherent in the information processing service provided by the servers, and is commonly used by a plurality of sessions.

(Procedures for Introducing the Intermediate Device)

There are three procedures, shown below, for introducing intermediate device 200, depending on the network protocol that is used, the intermediate device providing services, and the system environment that is applied. Intermediate device 200 may be introduced according to either one of the procedures, or intermediate device 200 may be introduced according to a procedure which is a combination of plural procedures depending on the system to which intermediate device 200 is applied.

(Procedure 1)

A procedure for introducing intermediate device 200 seamlessly when a session has already been established between client 100 and server 300 and they have been communicating with each other through networks 2, 3 will be described below. It is assumed that server 301 is added at the same time that intermediate device 200 is introduced. It is also assumed that configurational settings and execution detail settings with respect to the intermediate device providing services to be provided by intermediate device 200 have been registered in advance in intermediate device 200 by the operator such as the system administrator. The information set and registered by the operator is managed by intermediate device providing service management unit 203.

An environment to which procedure 1 is applied is that events relative to the information processing service run on client 100 and server 300 can be known or cannot be known by the third party from session information. Intermediate device 200 attempts to acquire necessary session information. If intermediate device 200 is unable to acquire all necessary session information, then the session that has been established before intermediate device 200 is introduced cannot be recreated after intermediate device 200 is introduced. For example, the session that has already been established between client 100 and server 300 before intermediate device 200 is introduced may be encrypted by negotiations between client 100 and server 300. In such a case, intermediate device 200 is unable to recreate the session because it cannot understand the information exchanged in the session.

Figure 3:
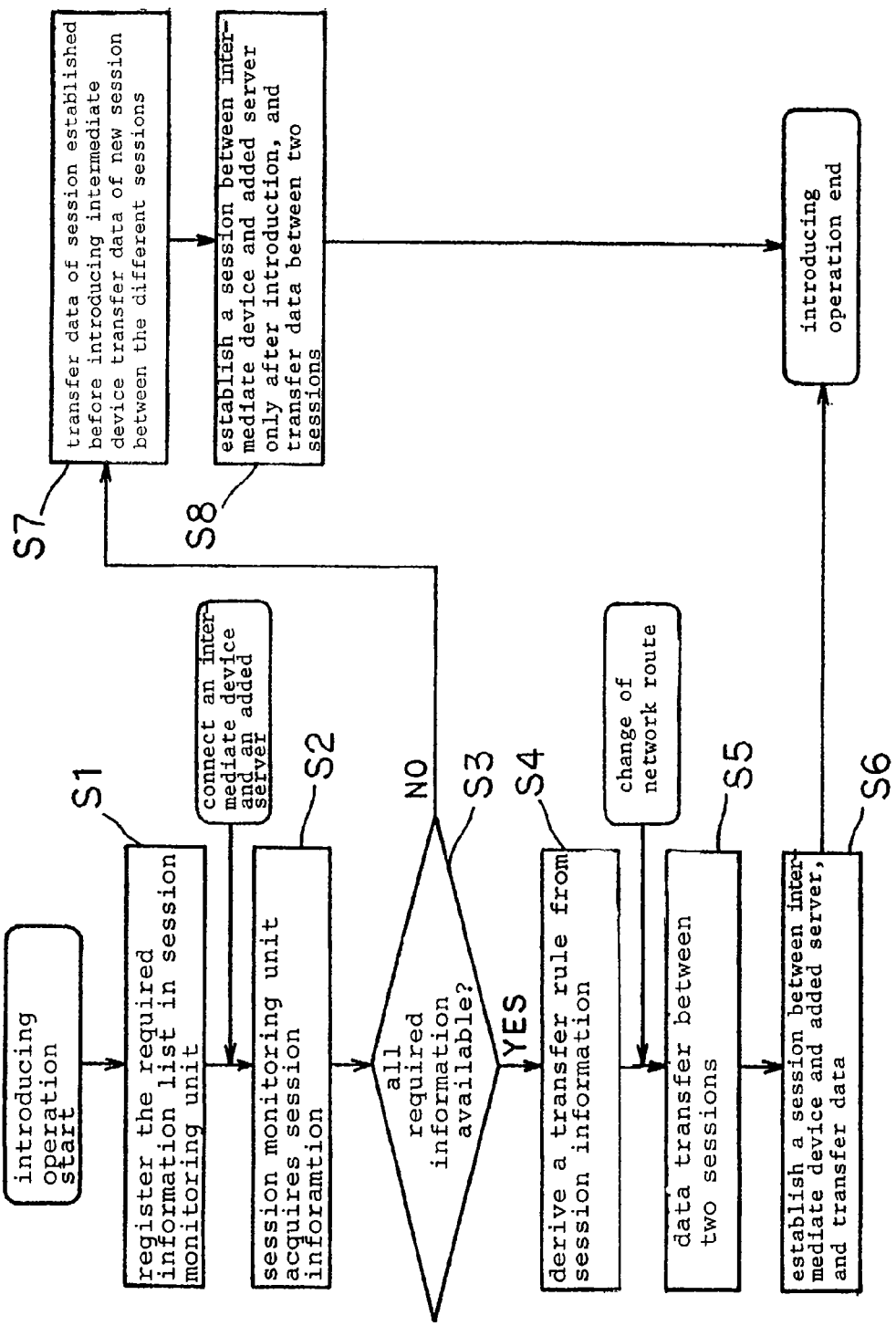
FIG. 3 is a flowchart showing the flow of a process carried out when the intermediate device is introduced according to procedure 1.

FIG. 3 is a flowchart showing the flow of a process carried out when the intermediate device is introduced according to procedure 1. The procedure shown in FIG. 3 begins when a session has already been established between client 100 and server 300 and they have been communicating with each other through networks 2, 3.

Intermediate device providing service management unit 203 generates a list of information that is required to be acquired to perform intermediate device providing services (hereinafter referred to as "required information list") from service settings specified by the operator, and registers the required information list in session monitoring unit 204 (step S1).

For example, if the protocol handled by intermediate device 200 is TCP (Transmission Control Protocol), then intermediate device providing service management unit 203 determines a required information list for performing services, as follows:

When a session (referred to as "connection" according to TCP) is established between client 100 and server 300, each of client 100 and server 300 adds a sequence number to a communication packet of data and sends the communication packet. When client 100 or server 300 which has received the communication packet with the sequence number added thereto responds to the communication packet, it counts up the sequence number added to the received packet by "1", and adds the sequence number to a responding communication packet. When client 100 or server 300 receives the responding communication packet, it refers to the sequence number added thereto and confirms that the communication packet sent thereby reached the other party. TCP also includes a function to control the amounts of data stored in reception buffers of client 100 and server 300 and the state of a session such as the establishment (beginning) or the cancellation (ending) of the session.

For intermediate device 200 to be introduced seamlessly between client 100 and server 300 and to transfer communication packets in the TCP session, intermediate device 200 is required to collect the sequence number, the amounts of data stored in the reception buffers, and the session state from the session information, and to add session information for not causing a mismatch before and after communication packets are transferred, to communication packets to be transferred. The information that is required by intermediate device 200 represents information about the sequence number, the amounts of data stored in the reception buffers, and the session state.

When the required information is determined, intermediate device 200 and server 301 are newly connected to network switch 150. The system now takes on the physical arrangement shown in FIG. 1.

Network switch 150 has been set to transfer communication packets flowing between networks 2, 3 to network 1 of intermediate device 200, using the function to copy and transfer communication packets as described above. When communication packets are transferred to intermediate device 200, data packets obtained through network interface 201 are sent to session monitoring unit 204.

Session monitoring unit 204 analyzes session information transmitted in the existing session that has been established between client 100 and server 300, and extracts session information that is in conformity with the acquired information list registered by intermediate device providing service management unit 203. Session monitoring unit 204 then sends the session information in association with the event of the information processing service that has been provided from server 300 to client 100, to intermediate device providing service management unit 203 (step S2).

Intermediate device providing service management unit 203 determines whether all the information set forth in the acquired information list can be acquired from a session group that has been established before intermediate device 200 is introduced or not (step S3).

If all the information can be acquired, then intermediate device providing service management unit 203 acquires the information, generates transfer rules for appropriately transferring communication packets from the acquired information and settings specified by the operator, and registers the transfer rules in packet transfer control unit 202 (step S4). At this time, however, the transfer rules are simply registered, but not effective yet.

The route of communication packets flowing on the session is changed from a route extending from client 100 directly to server 300 to a route extending from client 100 through intermediate device 200 to server 300. At this time, a process depending on the configurations of the networks connected to network switch 150, which are provided by changing settings of network switch 150 and changing the IP address of intermediate device 200 or server 300, is employed.

When communication packets are routed through intermediate device 200, the communication packets that are sent from client 100 to server 300 in the existing session go through network interface 201 to packet transfer control unit 202 in intermediate device 200. Intermediate device 200 establishes a new session between intermediate device 200 and server 300, transfers data of communication packets from client 100 using the new session established between intermediate device 200 and server 300, and maintains the session based on the session information acquired in advance so that the session established before intermediate device 200 is introduced will not be cut off (step S5).

Intermediate device providing service management unit 203 additionally registers new transfer rules in packet transfer control unit 202 in order to achieve matching between the session information between client 100 and intermediate device 200 and the session information between intermediate device 200 and server 300.

When transfer rules are completed for all the sessions established before intermediate device 200 is introduced and data can be transferred with matching achieved between two sessions, intermediate device providing service management unit 203 instructs packet transfer control unit 202 to make effective the transfer rules that have been registered in advance.

Packet transfer control unit 202 starts transferring data according to the transfer rules, thereby starting to provide intermediate device providing services. After intermediate device providing services have begun, when a need arises to transfer an access from client 100 to newly introduced server 301 according to the transfer rules, intermediate device 200 establishes a new session between intermediate device 200 and server 301, and transfers data (step S6). At this time, intermediate device 200 transfers data between the session between client 100 and intermediate device 200 and the session between intermediate device 200 and server 301, or between the three sessions further including the session between intermediate device 200 and existing server 300, and maintains those sessions.

As described above, intermediate device 200 generates transfer rules using the acquired session information, takes over the state of the existing session between itself and client 100, establishes a new session between itself and server 300, and transfers data using the existing session and the new session. Therefore, intermediate device 200 is seamlessly introduced to start providing intermediate device providing services without causing the user of client 100 to be concerned about the introduction of intermediate device 200.

If the required information cannot be acquired in step S3, then intermediate device providing service management unit 203 instructs packet transfer control unit 202 to transfer communication packets in the session established before intermediate device 200 is introduced and maintain the session. The required information cannot be acquired if the session information cannot be decoded because it is encrypted. If there is a request to establish a new session from client 100, then intermediate device providing service management unit 203 establishes a session between itself and client 100, establishes a session between itself and server 300, and instructs packet transfer control unit 202 to transfer data between those sessions (step S7).

As a result, only the session in which intermediate device 200 transfers data between two sessions, i.e., only the session established after intermediate device 200 is introduced, is subject to the intermediate device providing services.

If the session needs to be encrypted at this time, then intermediate device 200 performs an encrypting authentication when it establishes a new session, establishes a session between itself and client 100, and establishes a session between itself and server 300, thereby making it possible to transfer data between the two sessions.

After the intermediate device providing services have begun, when a need arises to transfer only a session newly established by a request from client 100 to server 301, intermediate device 200 establishes a new session between itself and server 301, and transfers data (step S8). Since a session is normally not continued for an indefinite period of time, all sessions will eventually be subject to the intermediate device providing services.

As described above, if all required state information cannot be acquired, then intermediate device 200 starts intermediate device providing services without having the existing session subject thereto, and continues the existing session. Consequently, while the service provided so far is being continuously provided all the way to the user of client 100 which has received the information processing service in the existing session, intermediate device 200 is seamlessly introduced to start the intermediate device providing services.

(Procedure 2)

As with procedure 1, a procedure for introducing intermediate device 200 seamlessly when a session has already been established between client 100 and server 300 and they have been communicating with each other through networks 2, 3 will be described below. It is assumed that server 301 is added at the same time that intermediate device 200 is introduced. It is also assumed that configurational settings and execution detail settings with respect to the intermediate device providing services to be provided by intermediate device 200 have been registered in advance in intermediate device 200 by the operator such as the system administrator. The information set and registered by the operator is managed by intermediate device providing service management unit 203.

An environment to which procedure 2 is applied is an environment in which service inherent information required for intermediate device 200 to transfer communication packets can be acquired directly from client 100 or server 300 using the existing protocol. In this case, intermediate device 200 attempts to acquire the required information directly from client 100 and server 300.

Figure 4:
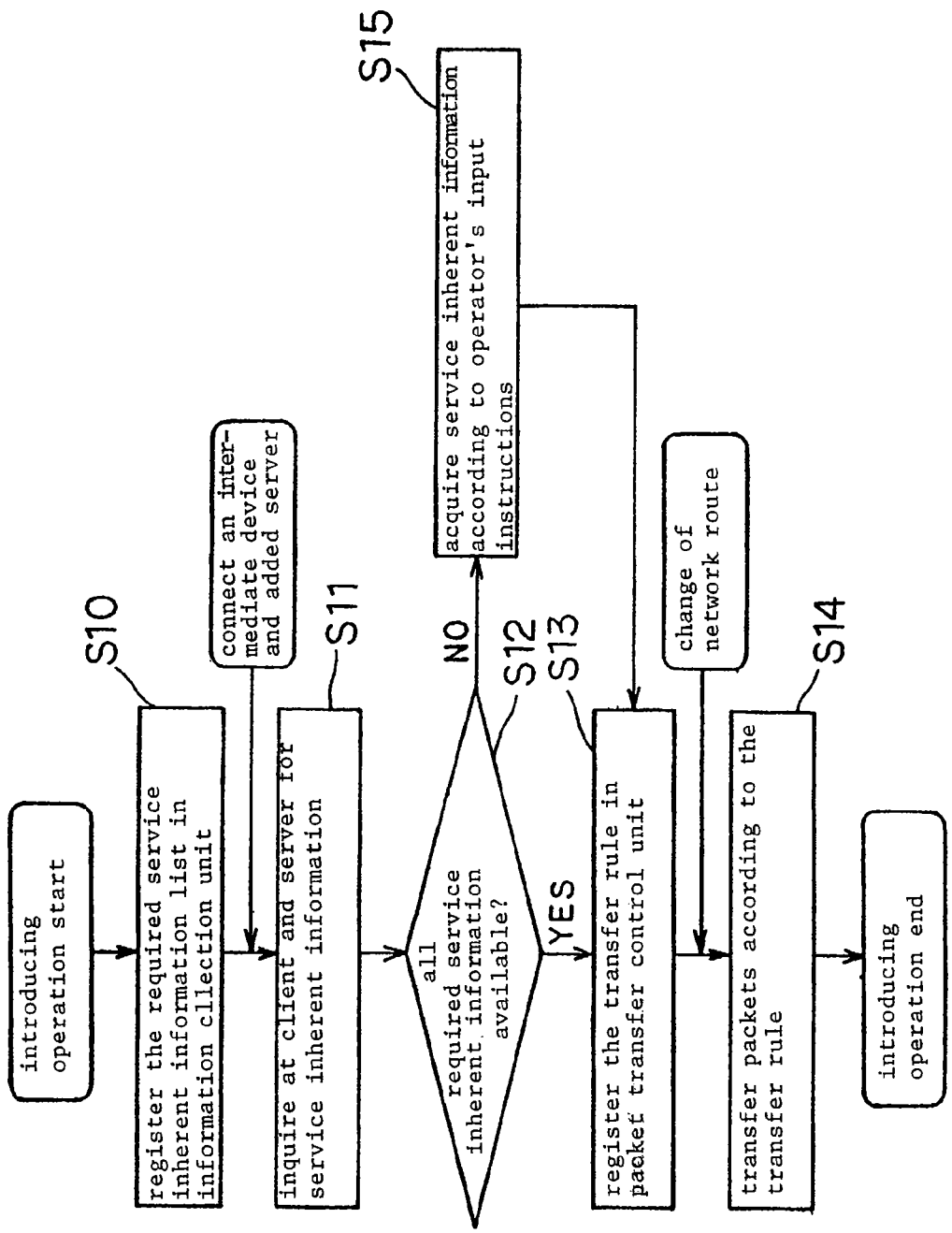
FIG. 4 is a flowchart showing the flow of a process carried out when the intermediate device is introduced according to procedure 2.

FIG. 4 is a flowchart showing the flow of a process carried out when the intermediate device is introduced according to procedure 2. The procedure shown in FIG. 4 begins when a session has already been established between client 100 and server 300 and they have been communicating with each other through networks 2, 3.

Intermediate device providing service management unit 203 generates a list of service inherent information that is required to be acquired to perform intermediate device providing services (hereinafter referred to as "required service inherent information list") from service settings specified by the operator, and registers the required service inherent information list in information collecting unit 206 (step S10).

Intermediate device 200 and server 301 are now newly connected to network switch 150. The system now takes on the physical arrangement shown in FIG. 1.

Then, information collecting unit 206 inquires at client 100 and servers 300, 301 for service inherent information described in the required service inherent information list generated by intermediate device providing service management unit 203. The inquiry is made using the protocol that has been provided in advance in client 100 and servers 300, 301. Information collecting unit 206 sends the obtained service inherent information in association with the event of the information processing service that has been provided from servers 300, 301 to client 100, to intermediate device providing service management unit 203 (step S11). The information is saved in intermediate device providing service management unit 203.

Then, intermediate device providing service management unit 203 determines whether all the information set forth in the acquired service inherent information list could have been acquired from client 100 or servers 300, 301 or not (step S12).

If all the required information could have been acquired, then intermediate device providing service management unit 203 generates transfer rules for appropriately transferring data of communication packets to which the intermediate device providing services are applied, from the saved service inherent information and service settings specified by the operator, and registers the transfer rules in packet transfer control unit 202 (step S13).

If all the required information could not have been acquired in step S12, then intermediate device providing service management unit 203 acquires service inherent information according to operator's input instructions (step S15), generates transfer rules for appropriately transferring data of communication packets, from the acquired service inherent information and service settings specified by the operator, and registers the transfer rules in packet transfer control unit 202 in step S13. If required service inherent information cannot even be registered by the operator's input, then the intermediate device providing services cannot be provided.

The route in which communication packets are transmitted between client 100 and server 300 is changed from a route extending from client 100 directly to server 300 to a route extending from client 100 through intermediate device 200 to server 300. At this time, a process depending on the configurations of the networks connected to network switch 150, which are provided by changing settings of network switch 150 and changing the IP address of intermediate device 200 or server 300, is employed.

After communication packets are sent to packet transfer control unit 202 of intermediate device 200, the communication packets from client 100 are transferred to server 300 or server 301 according to the transfer rules at the same time that the intermediate device providing services begin (step S14).

(Procedure 3)

As with procedures 1, 2, a procedure for introducing intermediate device 200 seamlessly when a session has already been established between client 100 and server 300 and they have been communicating with each other through networks 2, 3 will be described below. It is assumed that server 301 is added at the same time that intermediate device 200 is introduced. It is also assumed that configurational settings and execution detail settings with respect to the intermediate device providing services to be provided by intermediate device 200 have been registered in advance in intermediate device 200 by the operator such as the system administrator. The information set and registered by the operator is managed by intermediate device providing service management unit 203.

An environment to which procedure 3 is applied is an environment which employs, among various communication protocols, a protocol having a function to recover the state of a session that has been nullified by a sudden fault of a client or a server. The communication protocols of this type have a function to reestablish a session between a client and a server upon recovery from a fault of the client or the server after a session has been nullified by the fault, and to recover the state of the session to a state prior to the occurrence of the fault. The present procedure is effective when a communication protocol which is incapable of acquiring required state information from the contents of communication packets in an already established session is employed. Even in this case, intermediate device 200 reestablishes a session and acquires required state information in the process of reestablishing the session, thereby seamlessly starting intermediate device providing services.

Figure 5:
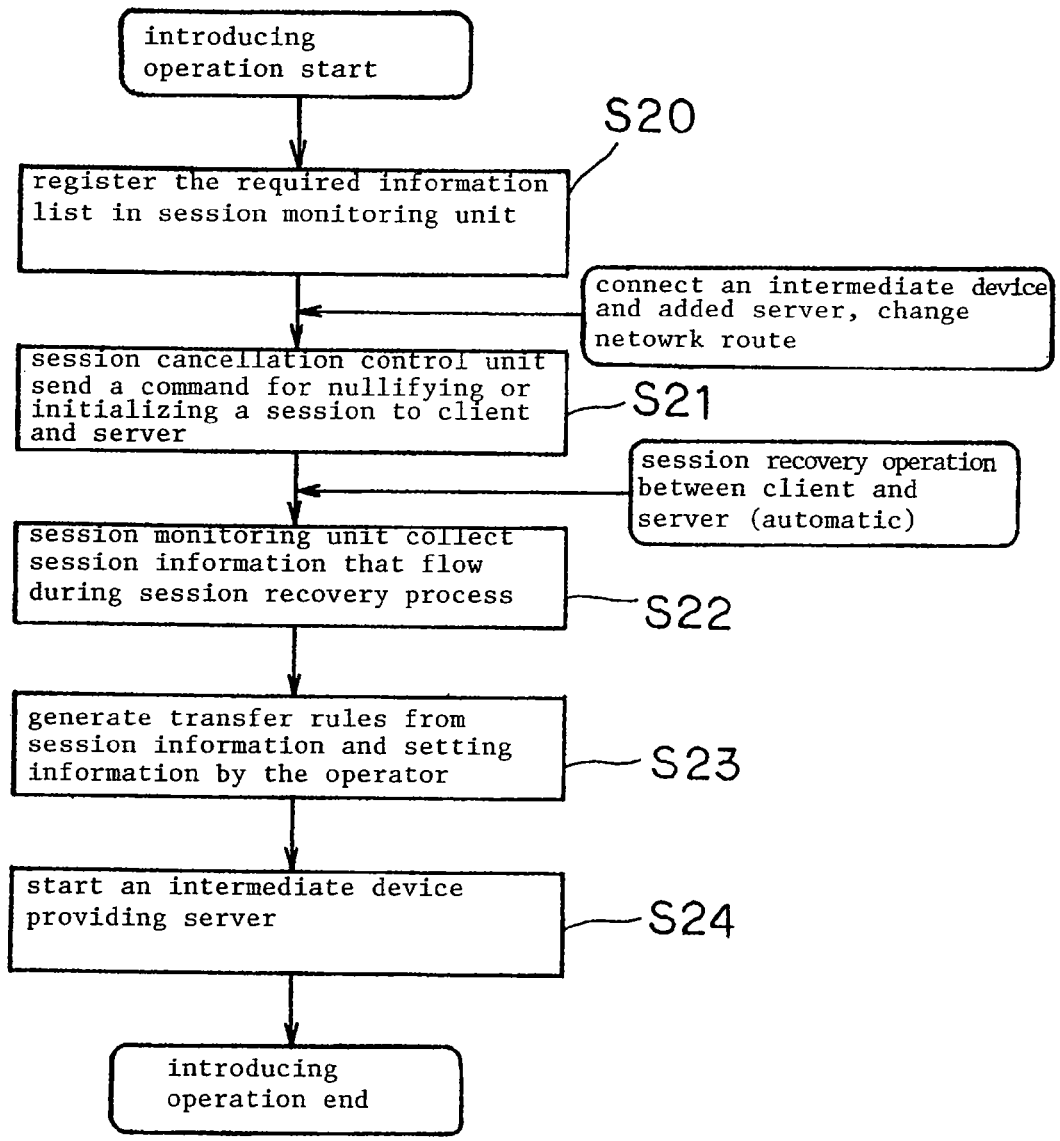
FIG. 5 is a flowchart showing the flow of a process carried out when the intermediate device is introduced according to procedure 3.

FIG. 5 is a flowchart showing the flow of a process carried out when the intermediate device is introduced according to procedure 3. The procedure shown in FIG. 5 begins when a session has already been established between client 100 and server 300 and they have been communicating with each other through networks 2, 3.

Intermediate device providing service management unit 203 generates a list of information that is required to be acquired to perform services (hereinafter referred to as "required information list") from service settings specified by the operator, and registers the required information list in session monitoring unit 204 (step S20).

Intermediate device 200 and server 301 are now newly connected to network switch 150. The system now takes on the physical arrangement shown in FIG. 1. The route in which communication packets are transmitted between client 100 and server 300 is changed from a route extending from client 100 directly to server 300 to a route extending from client 100 through intermediate device 200 to server 300. At this time, a process depending on the configurations of the networks connected to network switch 150, which are provided by changing settings of network switch 150 and changing the IP address of intermediate device 200 or server 300, is employed.

Then, intermediate device 200 sends a command for nullifying or initializing a session from session cancellation control unit 205 to client 100 and server 300 (step S21). The command for nullifying or initializing a session is issued in order to reestablish a session.

Having received the command, client 100 and server 300 attempts to establish a new session according to a session recovery function. If intermediate device 200 collects communication packets between client 100 and server 300 in a session recovery process, then intermediate device 200 can acquire all session information from the beginning of the process of establishing a session. The session information is collected by session monitoring unit 204, and the collected session information is registered in intermediate device providing service management unit 203 (step S22).

Intermediate device providing service management unit 203 generates transfer rules for appropriately transferring communication packets to which the intermediate device providing services are applied, from service settings specified by the operator, and registers the transfer rules in packet transfer control unit 202 (step S23). At this time, intermediate device providing service management unit 203 sends the session information acquired in step S22 as auxiliary information for packet transfer to packet transfer control unit 202.

Then, intermediate device providing service management unit 203 establishes sessions between client 100 and both servers 300, 301, and transfers data between the different sessions according to the transfer rules.

(Procedure for Removing the Intermediate Device)

A procedure for removing intermediate device 200 seamlessly from the state in which intermediate device 200 is temporarily introduced between client 100 and servers 300, 301 as shown in FIG. 1 will be described below.

Figure 6:
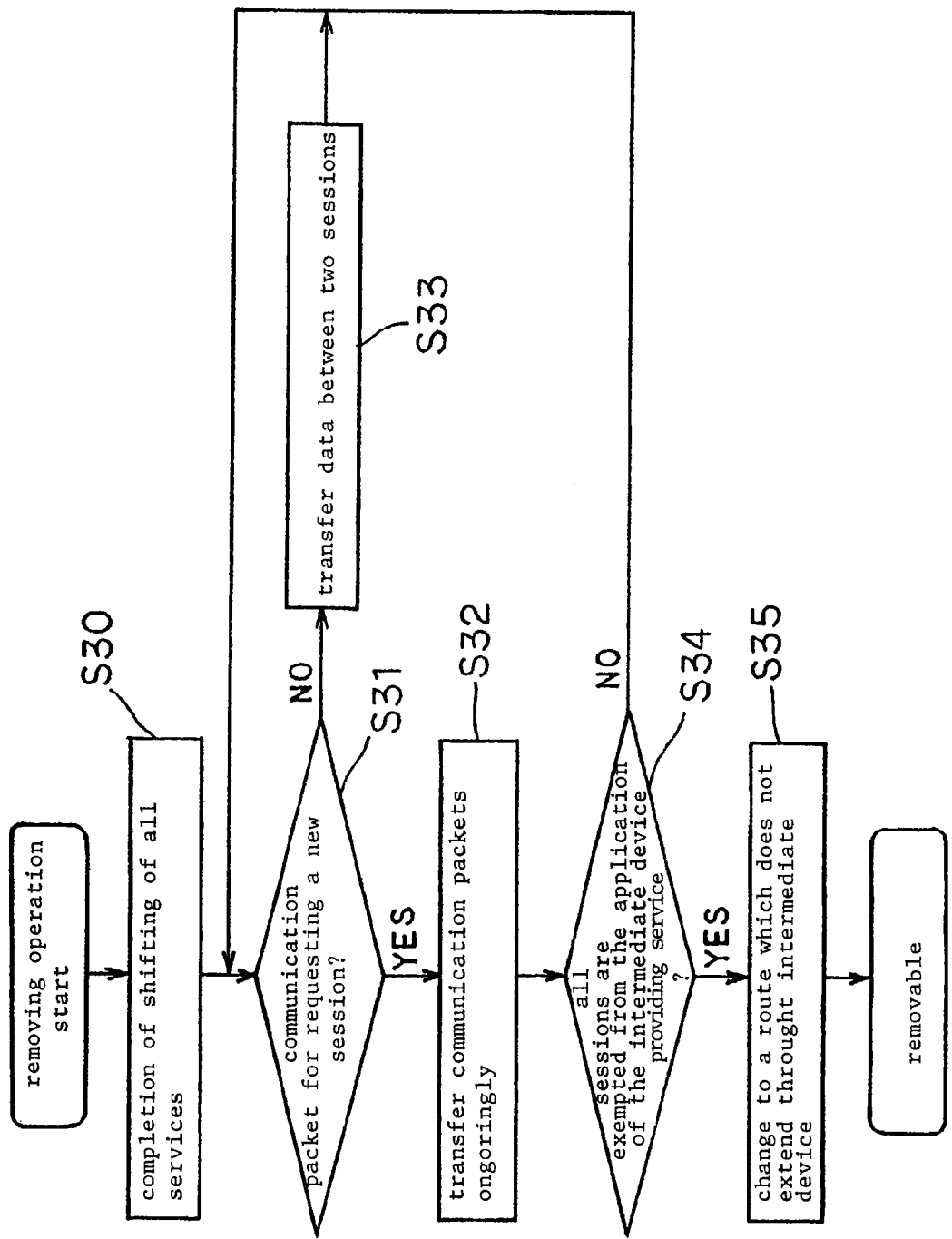
FIG. 6 is a flowchart showing the flow of a process carried out when the intermediate device is removed.

FIG. 6 is a flowchart showing the flow of a process carried out when the intermediate device is removed.

By way of example, it is assumed that intermediate device 200 is temporarily introduced to shift a service provided by server 300 to server 301 without causing the client to be aware of the shifting of the service. In order not to cause the client to be aware of the shifting of the information processing service between the servers, intermediate device 200 can replace the service of server 300 with the service of server 301 while integrating the information processing services of server 300 and server 301. When the shifting of the information processing service between the servers is completed, intermediate device 200 is removed.

As shown in FIG. 6, after the service that has been provided by server 300 is shifted to server 301 by intermediate device 200 (step S30), intermediate device 200 is removed.

When packet transfer control unit 202 of intermediate device 200 receives a communication packet from client 100, packet transfer control unit 202 determines whether it is a communication packet for requesting a new session to be established or not (step S31).

If the communication packet from client 100 is a communication packet for requesting a new session to be established, then intermediate device 200 exempts the communication packet from the application of the intermediate device providing services, transfers the communication packet directly to new server 301, and does not establish a session by itself (step S32). A new session is now established directly between client 100 and server 301 without the intervention of intermediate device 200.

If the communication packet from client 100 is a communication packet of an existing session, then intermediate device 200 applies the intermediate device providing services to the communication packet, and transfers data between two sessions, i.e., a session between client 100 and intermediate device 200 and server 300 or server 301 as before (step S33). Control then goes back to step S31.

After step S32, packet transfer control unit 202 determines whether all sessions are exempted from the application of the intermediate device providing services or not (step S34). Since a session is normally not continued for an indefinite period of time, all sessions will eventually be exempted from the application of the intermediate device providing services.

If all sessions are exempted from the application of the intermediate device providing services, then the route of communication packets is changed to a route which does not extend through intermediate device 200 (step S35). If there are sessions left subject to the intermediate device providing services in step S34, then control goes back to step S34 and intermediate device 200 continues the intermediate device providing services until all sessions become exempted from the application of the intermediate device providing services.

After step S35, intermediate device 200 is disconnected from the network and brought into a removable state.

As described above, intermediate device 200 continues to apply the intermediate device providing services to the existing session until the session is finished, exempts a new session from the intermediate device providing services, and is judged as being in a removable state when all sessions become exempted from the application of the intermediate device providing services. Therefore, intermediate device 200 can be removed from between client 100 and servers 300, 301 without causing both the user of the existing session and the user of the new session to be aware of the removal of intermediate device 200.

1st Embodiment

A first embodiment in which the intermediate device according to the present invention is applied to a generally used NFS protocol environment will be described below. The intermediate device providing services are that accesses from an NFS client to a plurality of NFS servers are integrated to cause the user of the NFS client to be unaware of the number and configurations of NFS servers.

(Seamless Introduction of the Intermediate Device in NFS Protocol Environment)

An example in which the intermediate device is introduced seamlessly into an environment wherein NFS servers provide an information processing service capable of providing access to their own storage resources according to the NFS protocol will be illustrated. The intermediate device serves to integrate the storage resources of a plurality of NFS servers and provide them to an NFS client.

Figure 7:
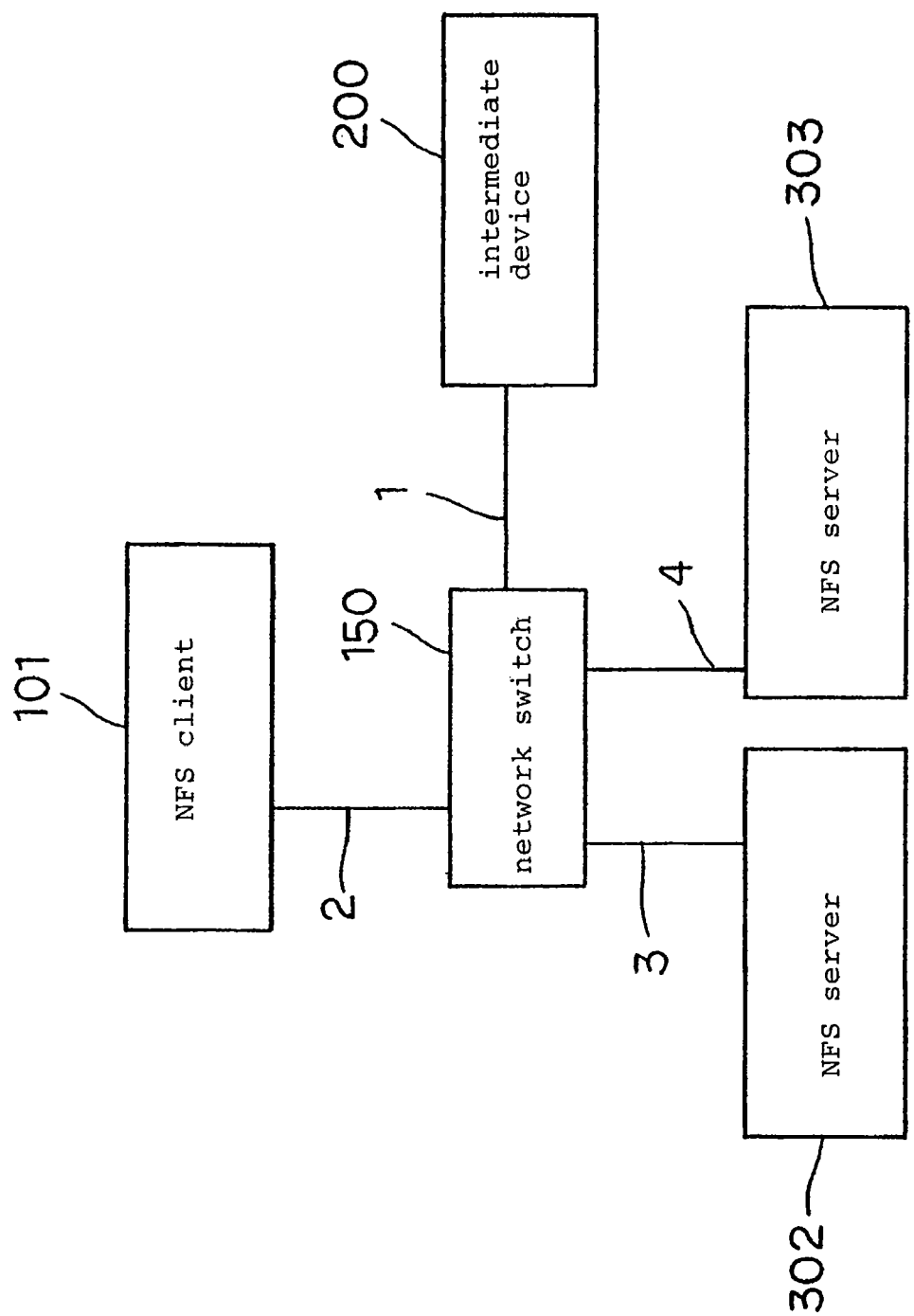
FIG. 7 is a block diagram showing an arrangement of a system according to a first embodiment of the present invention.

FIG. 7 is a block diagram showing an arrangement of a system according to a first embodiment of the present invention. FIG. 7 shows the arrangement of the system in which an intermediate device and a newly added NFS server have been introduced. The system according to the first embodiment has NFS client 101, intermediate device 200, NFS servers 302, 303, and network switch 150. Although one or two units of each device are illustrated in FIG. 7, the number of units of each device is optional.

Each of NFS client 101, intermediate device 200, and NFS servers 302, 303 has an interface for network connections in order to communicate with other devices. Intermediate device 200 is connected to network 1, NFS client 101 to network 2, NFS server 302 to network 3, and NFS server 303 to network 4. Networks 1 through 4 are connected to respective ports of network switch 150. This configuration of the system allows client 101, intermediate device 200, and NFS servers 302, 303 to communicate with each other.

NFS servers 302, 303 can provide a information processing service to NFS client 101 through the networks. The information processing service provided by NFS servers 302, 303 is a service for allowing the client to access storage resources, and will be referred to as "data access service".

NFS Client 101 can access NFS servers 302, 303 and use the data access service provided by NFS servers 302, 303. Network switch 150 and intermediate device 200 are the same as those shown in FIGS. 1 and 2.

(Introducing Procedure)

A procedure for introducing intermediate device 200 and NFS server 303 seamlessly in an environment wherein NFS client 101 and NFS server 302 are communicating with each other according to the NFS protocol will be described below. Networks 2, 3 are assigned respective IP addresses such that they are in the same network domain, and NFS client 101 and NFS server 302 communicate with each other through networks 2, 3 according to the NFS protocol.

Intermediate device providing service management unit 203 generates a list of service inherent information that is required to perform services (hereinafter referred to as "required service inherent information list") from service settings specified by the operator, and registers the required service inherent information list in information collecting unit 206.

In this situation, network 1 of intermediate device 200 and network 4 of NFS server 303 are connected to network switch 150. After networks 1, 4 are assigned respective IP addresses such that they are in the same network domain as networks 2, 3, networks 1, 4 are activated. Network settings are also made for intermediate device 200 and NFS server 303.

After networks 1, 4 are activated, new NFS server 303 activates a data access service for providing the client with access to its own storage resources, making it possible to access the storage resources according to the NFS protocol.

After the network settings have been made for intermediate device 200 and NFS server 303, information collecting unit 206 of intermediate device 200 collects service inherent information required to integrate the data access services provided by NFS server 302 and NFS server 303 according to the NFS protocol, from NFS server 302 and NFS server 303 according to the NFS protocol.

Integrating data access services refers to access from NFS client 101 through intermediate device 200 so that NFS server 302 and NFS server 303 will be provided as a single NFS server, i.e., a single storage resource, to the client.

To realize the above integration, intermediate device 200 determines a request destination from an access request from NFS client 101, and transfers a request to an NFS server which stores a resource as the request destination.

According to the NFS protocol, an identifier called a file handle generated by an NFS server is used as an ID for uniquely identifying a data object to be accessed, such as a directory or a file. When an NFS client uses a data access service, the request from the NFS client necessarily includes a file handle.

Intermediate device 200 can easily identify an NFS server as a transfer destination by incorporating the identifiers of NFS servers that are integrated by intermediate device 200 into respective file handles.

If NFS client 101 and NFS server 302 have already been communicating with each other before intermediate device 200 is introduced, then there is an original file handle generated by NFS server 302. In order for intermediate device 200 to be introduced seamlessly, intermediate device 200 has to use the original file handle continuously as it is. Therefore, intermediate device 200 has to identify NFS server 302 or NFS server 303 as a transfer destination for a request from the original file handle that is included in the request.

Although a process of generating a file handle is generally optional, it is usually patterned by the mounting of each NFS server. A generated file handle contains information of a file system storing data objects and information of stored devices.

These items of information comprise a data string which is common to file handles in the same NFS server. If intermediate device 200 can extract the regularity of the pattern that is common to a plurality of file handles, then intermediate device 200 can use it as an identifier for identifying an NFS server (hereinafter referred to as "server identifier") for transferring communication packets to the NFS server. Specifically, if a server identifier capable of identifying a server having a data object is extracted from a file handle which represents information identifying the data object, then the server identifier can be used as service inherent information. Intermediate device 200 needs to identify a destination server from a file handle of a data object in order to transfer data of communication packets in the intermediate device providing services. If a server identifier can be extracted, then intermediate device 200 does not need to acquire and record all existing file handles, and can identify a destination server simply by seeing the server identifier that is contained in part of the file handle. As a result, intermediate device 200 can realize the intermediate device providing services with a reduced amount of processing and a reduced storage capacity.

The data length of an NFS file handle is variable or fixed in each NFS server. For example, if the data lengths of file handles are different between NFS servers, then the data lengths can be used as server identifiers for transferring communication packets to the NFS servers.

Intermediate device 200 acquires a plurality of file handles from NFS server 302 and NFS server 303 according to the NFS protocol, and extracts server identifiers required to integrate data access services from the acquired file handles and the file handle generating process described above.

Figure 8:
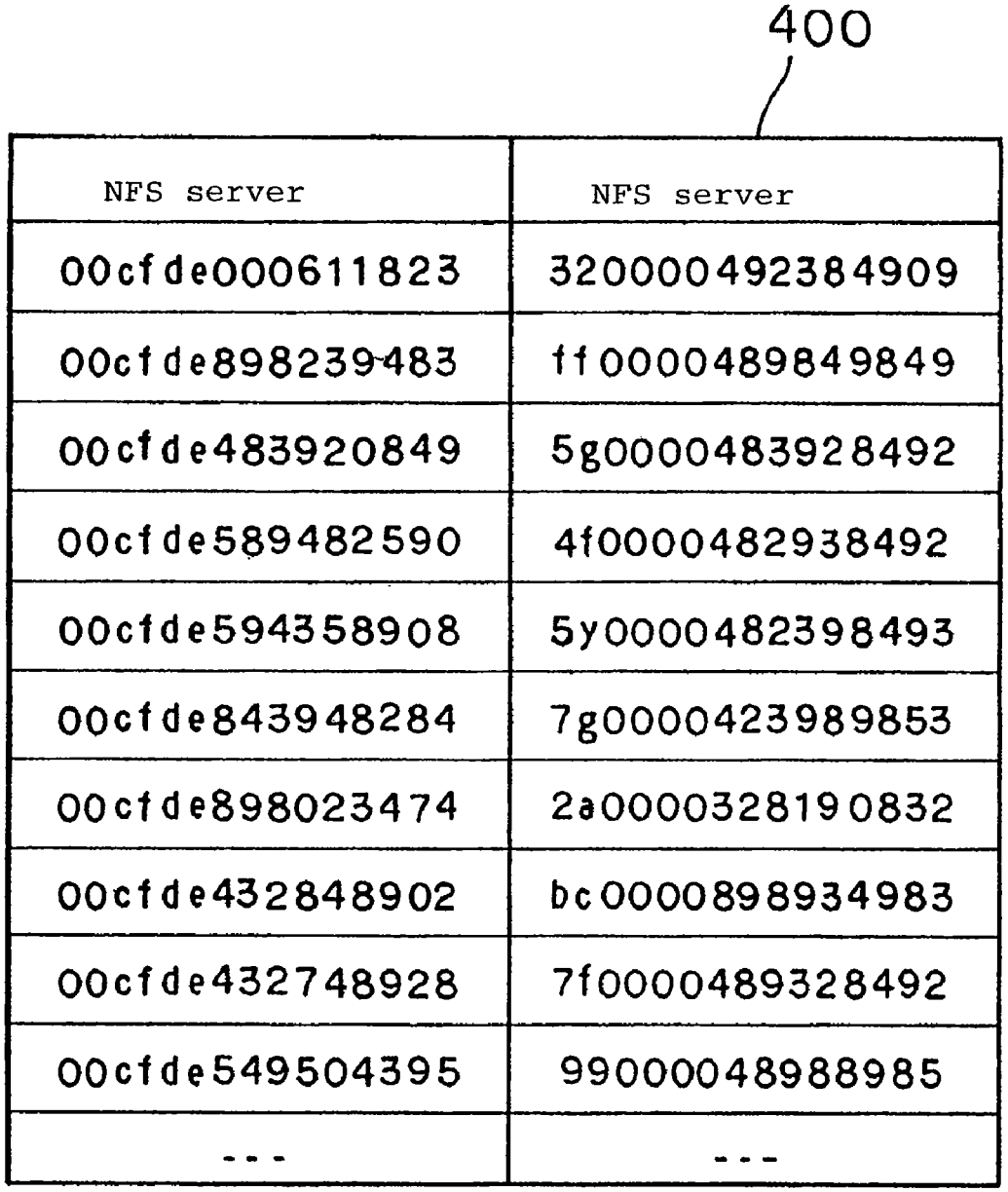
FIG. 8 is a table showing an example of file handles of NFS servers according to an NFS protocol.

FIG. 8 is a table showing an example of file handles of NFS servers according to the NFS protocol. The file handle table 400 shown in FIG. 8 shows a list of data patterns of file handles of two NFS servers A, B. According to the list of NFS server A, third to sixth digits from the left of all the data patterns represent "cfde" common to all the file handles.

According to the list of NFS server B, third to sixth digits from the left of all the data patterns represent "0000" common to all the file handles. This indicates that intermediate device 200 may extract the data of the third to sixth digits as server identifiers capable of identifying servers.

If intermediate device 200 cannot extract server identifiers based on certain patterns or certain data lengths from the file handles acquired from NFS server 302 and NFS server 303, then intermediate device 200 acquires all the file handles from NFS server 302 and NFS server 303, associates the file handles and the NFS servers in a table, and holds the table. When intermediate device 200 receives a communication packet from NFS client 101, intermediate device 200 checks a file handle included in the communication packet against the table to identifies an NFS server as a transfer destination.

In intermediate device 200, original file handles of NFS servers which are contained in communication packets according to the NFS protocol are registered in packet transfer control unit 202 for identifying appropriate NFS servers from the original file handles, and transfer rules for intermediate device providing services for integrating data access services are registered from intermediate device providing service management unit 203 into packet transfer control unit 202. Thereafter, intermediate device 200 starts the intermediate device providing services. Subsequently, network settings are changed to route communication packets from client 101 through intermediate device 200. In the embodiment shown in FIG. 7, the IP address assigned to network 3 of NFS server 302 is assigned to network 1 of intermediate device 200, and the IP address of network 3 is changed to another IP address. The IP address of network 3 is registered in intermediate device 200 as the address of a transfer destination for communication packets destined for NFS server 302. According to the setting change, the route is changed for routing communication packets 101 necessarily through intermediate device 200.

Generally, the NFS protocol employs a TCP or a UCP (Unified Datagram Protocol) as a transport layer corresponding to a lower layer thereof.

According to the TCP, it is generally necessary to avoid a mismatch of information such as sequence numbers so that intermediate device 200 will continue a TCP session. Unless such a mismatch of information is avoided, A TCP session will be cut off. According to the NFS protocol, however, since the TCP is controlled independently of the NFS protocol, the control of the NFS protocol which is a higher protocol over the TCP is not affected even if a TCP session is cut off except for some exceptional instances. According to the UDP, there is no such concept as sessions in the UDP itself.

According to the TCP, therefore, when the transfer destination for communication packets is changed from NFS server 302 to intermediate device 200, the session between NFS client 101 and NFS serer 302 before intermediate device 200 is introduced may be cut off, and a new session may be reestablished between intermediate device 200 and client 101.

According to the UDP, when the transfer destination for communication packets is changed from NFS server 302 to intermediate device 200, intermediate device 200 may transfer communication packets from NFS client 101 as they are to NFS server 302. With respect to the protocol of the transport layer, as described above, intermediate device 200 can handle communication handles without giving rise to a mismatch under the control of the NFS protocol.

In an exceptional instance, if an NFS file system is soft-mounted according to the TCP, then when a session is cut off, the NFS client detects the session cutoff as an error. Therefore, if there is an NFS file system which is soft-mounted according to the TCP, then after the NFS client is registered in advance in intermediate device 200 by the operator, intermediate device 200 is introduced. Then, session monitoring unit 204 acquires session information of a TCP session of the soft-mounted NFS client according to a port mirroring function of network switch 150, and intermediate device providing service management unit 203 generates transfer rules and registers the transfer rules in packet transfer control unit 202.

As described above, a communication packet from NFS client 101 contains an original file handle generated by NFS server 302. Packet transfer control unit 202 determines a transfer destination by referring to a table registering certain patterns of file handles extracted from file handle information acquired from NFS server 302 and NFS server 303 or all file handles of NFS server 302 and NFS server 303.

If the protocol of the transport layer is the TCP, then intermediate device 200 establishes a new TCP session between itself and NFS server 302 with packet transfer control unit 202, or takes over a session of the soft-mounted NFS client according to the generated transfer rules, and transfers communication packets from NFS client 101 to NFS server 302. If the protocol of the transport layer is the UDP, then intermediate device 200 transfers communication packets from NFS client 101 as they are to NFS server 302 with packet transfer control unit 202.

After intermediate device 200 has started a service integrating data access services as the intermediate device providing services, when intermediate device 200 receives a communication packet from client 101, packet transfer control unit 202 can determine either NFS server 302 or NFS server 303 as a transfer destination based on regulations (contents) of the integrated service which have been set by the operator, using the original file handles generated by the respective NFS servers, and transfer communication packets to the determined transfer destination.

NFS client 101 thus can access a single NFS server without concern over the existing two NFS servers including NFS server 302 and NFS server 303. In other words, the introduction of intermediate device 200 and the integration of data access services as the intermediate device providing services of intermediate device 200 are carried out seamlessly with respect to NFS client 101.

2nd Embodiment

A second embodiment in which the intermediate device according to the present invention is applied to an NLM (Network Lock Manager) protocol environment will be described below. The contents of the intermediate device providing services are the same as those of the first embodiment.

(Seamless Introduction of the Intermediate Device in NLM Protocol Environment)

An example in which intermediate device 200 is introduce seamlessly between NFS client 101 and NFS server 302, as with the first embodiment, will be described below.

The NLM protocol is a protocol for providing a file lock function, and is normally used in an environment which employs the NFS protocol. Since the NFS protocol does not have a lock function, the NLM protocol makes up for a lock function. In an environment which employs the NFS protocol and the NLM protocol, file locks are saved as state information in the NFS servers and the NFS client in order to lock files.

In order to introduce the intermediate device seamlessly into the environment and continue the lock control of the NLM protocol without a mismatch, the intermediate device needs to recognize all the locked state information before the intermediate device is introduced.

The NLM protocol has a command for inspecting locks on files as a function for knowing locked states of files. Before intermediate device 200 enters the network between NFS client 101 and NFS server 302, intermediate device 200 can successively acquire locked state information of respective files provided by NFS server 302 in advance, using the command.

If the number of files managed by NFS server 302 is vast, then it is time-consuming to acquire all the locked state information. While the locked state information of respective files is being acquired, the locked state of an acquired file may possibly change. Therefore, it is difficult for intermediate device 200 to accurately recognize the locked state information of all files at the time intermediate device 200 is introduced, with a lock inspection command.

In readiness for a reboot of an NFS server after a fault, the NLM protocol has a function to recover the locked state information which has been effective before the NFS server is rebooted. Furthermore, in readiness for a reboot of an NFS client after a fault, the NLM protocol has a function to discard the locked state information which has been held by an NFS server.

Intermediate device 200 uses these functions to recognize the locked states before it is introduced.

(Introducing Procedure)

Since the NLM protocol is generally used in an environment which employs the NFS protocol, the system is of the same configuration as the first embodiment as shown in FIG. 7.

Intermediate device providing service management unit 203 generates a list of service inherent information that is required to perform intermediate device providing services (hereinafter referred to as "required service inherent information list") from service settings specified by the operator, and registers the required service inherent information list in session monitoring unit 204.

As with the first embodiment, intermediate device 200 and NFS server 303 are connected to network switch 150, and network settings are changed. Then, information collecting unit 206 acquires a list of NFS clients which are making file accesses to NFS server 302 from NFS server 302, and sends the list of NFS clients to intermediate device providing service management unit 203. The client list is a list of IOP addresses and computer names of NFS clients, and can be acquired using a command (MOUNT_DUMP) according to a MOUNT protocol which is necessarily used with the NFS protocol.

After the client list is acquired, the IP address is changed as with the first embodiment, so that communication packets which would normally be sent to NFS server 302 will be sent to intermediate device 200. After the route change setting is made, intermediate device providing service management unit 203 sends the NFS client list to session cancellation control unit 205, sends a notification indicating that NFS server 302 is regarded as being rebooted and the locks which have been effective before NFS server 302 is rebooted are nullified, to NFS clients 101 which are included in the client list. The notification is sent according to a command (SM_NOTIFY) that is available in an SM (Status Monitor) protocol used with the NLM protocol. Actually, NFS server 302 is not rebooted, but intermediate device 200 sends the SM_NOTIFY command as a dummy command in order to know the locked state of NFS server 302.

Having receiving the SM_NOTIFY command, NFS client 101 sends a re-lock request for re-locking all the files which have been locked to NFS server 302 in order to recover the locked state which has been effective immediately before intermediate device 200 is introduced.

As the re-lock request is set to intermediate device 200, session monitoring unit 204 acquires all the locked states into which the files of NFS server 302 have been placed by NFS client 101, from the contents of the re-lock request, and registers the acquired locked states in session cancellation control unit 205.

Session cancellation control unit 205 sends a command (SM_NOTIFY) indicating that NFS client 101 is rebooted to NFS server 302. Actually, NFS client 101 is not rebooted, but intermediate device 200 sends the SM_NOTIFY command as a dummy command in order to clear the locked states held by NFS server 302. The locked state information held in NFS server 302 is cleared. Then, session cancellation control unit 205 sends the re-lock request from NFS client 101 to NFS server 302 based on the registered locked state information. The locked state information is registered in intermediate device providing service management unit 203 from files whose locks are properly held.

By way of example, intermediate device 200 sends the SM_NOTIFY command indicating that NFS client is rebooted according to the SM protocol to NFS server 302. However, intermediate device 200 may instead employ a command (NLM_FREEALL) for nullifying all locks held by a request source, which is available in the NLM protocol. The latter command may be used to nullify all locks held by NFS server 302.

According to the above sequence of operation, intermediate device 200 can acquire all the lock state information which has been effective immediate prior to the introduction of intermediate device 200. Intermediate device 200 can thus match the locked states recognized by itself and the actual locked states in NFS server 302.

The locked state information which is recognized by intermediate device providing service management unit 203 of intermediate device 200 is used as one of the intermediate device providing services. For example, intermediate device 200 may shift data between NFS server 302 and NFS server 303 for the purposes of smoothing the storage capacities of the NFS servers and distributing access loads, according to one of the intermediate device providing services. In such a case, the process of shifting data should preferably be carried out in a manner concealed from NFS client 101, and the destination to which the data are shifted needs to recreate the same locked state as in the source from which the data are shifted. Therefore, intermediate device providing service management unit 203 reflects the locked state information in the transfer rules for transferring NLM packets, and registers the locked state information as auxiliary information for packet transfer in packet transfer control unit 202.

3rd Embodiment

A third embodiment in which the intermediate device according to the present invention is applied to a CIFS protocol environment will be described below. The contents of the intermediate device providing services are the same as those of the first and second embodiments.

(Seamless Introduction of the Intermediate Device in CIFS Protocol Environment)

It is assumed that the intermediate device is introduced for the purpose of integrating the storage resources of a plurality of CIFS servers. A new CIFS server is introduced, and the intermediate device integrates the existing CIFS server and the newly introduced CIFS server.

Figure 9:
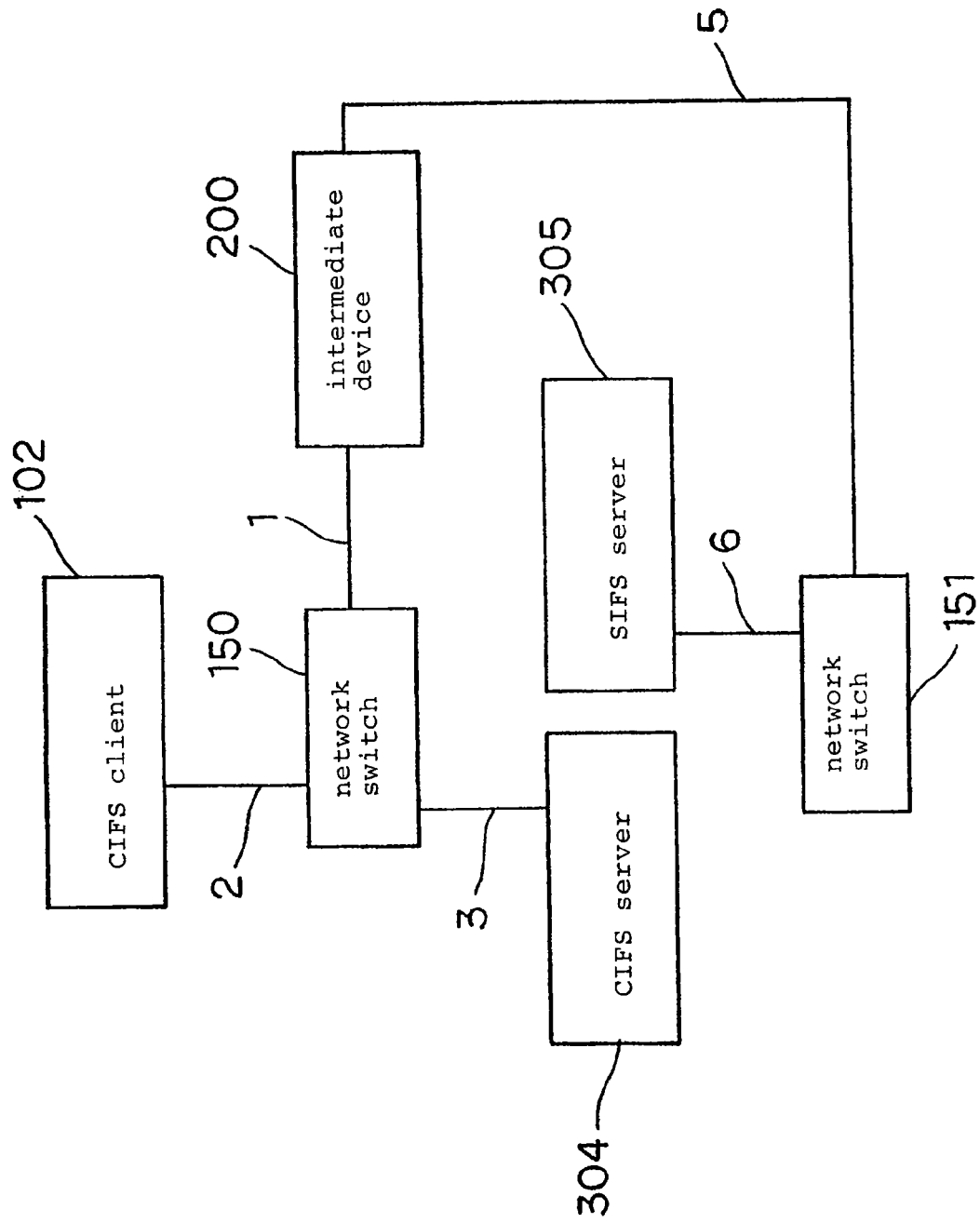
FIG. 9 is a block diagram showing an arrangement of a system according to a third embodiment of the present invention.

FIG. 9 is a block diagram showing an arrangement of a system according to a third embodiment of the present invention. FIG. 9 shows the arrangement of the system in which intermediate device 200 and newly added CIFS server 305 have been introduced.

As shown in FIG. 9, the system according to the present embodiment has CIFS client 102, intermediate device 200, CIFS servers 304, 305, and network switches 150, 151. CIFS server 305 is a newly introduced CIFS server. Although one or two units of each device are illustrated in FIG. 9, the number of units of each device is optional.

Each of CIFS client 102, intermediate device 200, and CIFS servers 304, 305 has an interface for network connections in order to communicate with other devices. Intermediate device 200 is connected to network 1 and network 5, CIFS client 102 to network 2, CIFS server 304 to network 3, and CIFS server 305 to network 4. Networks 1 through 3 are connected to network switch 150, and networks 4, 5 to network switch 151. This configuration of the system allows CIFS client 102, intermediate device 200, and CIFS servers 304, 305 to communicate with each other.

CIFS servers 304, 305 can provide a information processing service to CIFS client 102 through the networks. The information processing service provided by CIFS servers 304, 305 is a service for allowing the client to access storage resources, and will be referred to as "data access service".

CIFS Client 102 can access CIFS servers 304, 305 and use the data access service provided by CIFS servers 304, 305.

Network switch 150 is the same as network switch 151. Network switch 150 and intermediate device 200 are the same as those shown in FIGS. 1 and 2.

(Introducing Procedure)

A procedure for introducing intermediate device 200 seamlessly in the networks between CIFS client 102 and CIFS server 304 in a situation wherein a session according to the CIFS protocol is established between CIFS client 102 and CIFS server 304 and CIFS client 102 and CIFS server 304 are communicating with each other will be described below.

It is assumed that CIFS client 102 and CIFS server 304 have established a session through networks 2, 3 connected to network 150 and have been communicating with each other. Then, network 1 of intermediate device 200 is connected to network switch 150, and network 5 of intermediate device 200 and network 6 of CIFS server 350 are connected to network switch 151.

Then, network 4 of CIFS server 350 is assigned an IP address such that is it in the same network domain as network 2 and network 3. Network settings are made for intermediate device 200 so that intermediate device 200 will function as a network bridge between network 1 and network 5, and the networks are put into operation.

After network settings are made for intermediate device 200 and CIFS server 305, network 3 of CIFS server 304 is disconnected from network switch 150 and connected to network switch 151.

With the connection of network 3 being thus changed, communication packets from CIFS client 102 according to the CIFS protocol are sent through network 1, intermediate device 200, network 5, and network 3 to CIFS server 304.

According to the CIFS protocol, for identifying a user who has established a session, the user is authenticated between CIFS client 102 and CIFS server 304, and thereafter an user ID which is effective only in the session is assigned by CIFS server 304. The user ID represents information which prevents a user name and a password as authentication information of the user from being acquired by the third party. Therefore, even when intermediate device 200 collects communication packets between CIFS client 102 and CIFS server 304, intermediate device 200 is unable to identify user information in the session which has been established before intermediate device 200 is introduced. Intermediate device 200 thus handles the session which has been established before intermediate device 200 is introduced, as being exempted from the intermediate device providing services.

In a session newly established from CIFS client 102 after intermediate device 200 is introduced, intermediate device 200 can acquire user authentication information from communication packets that are sent and received when the session is established. Intermediate device 200 can also acquire, without omission, session information such as locked states of files of CIFS servers by acquiring communication packets that are sent and received when the session is established according to the CIFS protocol. Using these items of information, intermediate device 200 can establish a session between itself and a CIFS server, and change a CIFS server as a connection destination from CIFS client 102 based on the rules of the intermediate device providing services. In this manner, intermediate device 200 handles the session which is newly established after intermediate device 200 is introduced, as being exempted from the intermediate device providing services.

Consequently, in intermediate device 200, intermediate device providing service management unit 203 handles the session which has been established before intermediate device 200 is introduced, as being exempted from the intermediate device providing services, in addition to the packet transfer rules based on service settings specified by the operator, and transfers communication packets thereof to a CIFS server. Intermediate device providing service management unit 203 also handles the session which is established after intermediate device 200 is introduced, as being exempted from the intermediate device providing services, and registers transfer rules for transferring communication packets thereof to a CIFS server in packet transfer control unit 202. Therefore, intermediate device 200 can handle the session which has been established before intermediate device 200 is introduced without interruptions. Accordingly, intermediate device 200 can be introduced seamlessly.

4th Embodiment

A fourth embodiment in which the intermediate device according to the present invention is applied to an online shopping site will be described below. The intermediate device providing services are a service for integrating WEB services provided by a plurality of WEB servers and providing them as a single WEB service to the user of a WEB client. For example, the service allows the user to purchase and pays for goods sold at a plurality of online shopping sites in one access.

(Seamless Introduction of the Intermediate Device in Online Shopping Site Environment)

The intermediate device is introduced for the purpose of integrating a plurality of WEB services running online shopping sites to integrate the individual shopping site and showing them as a single shopping site.

Figure 10:
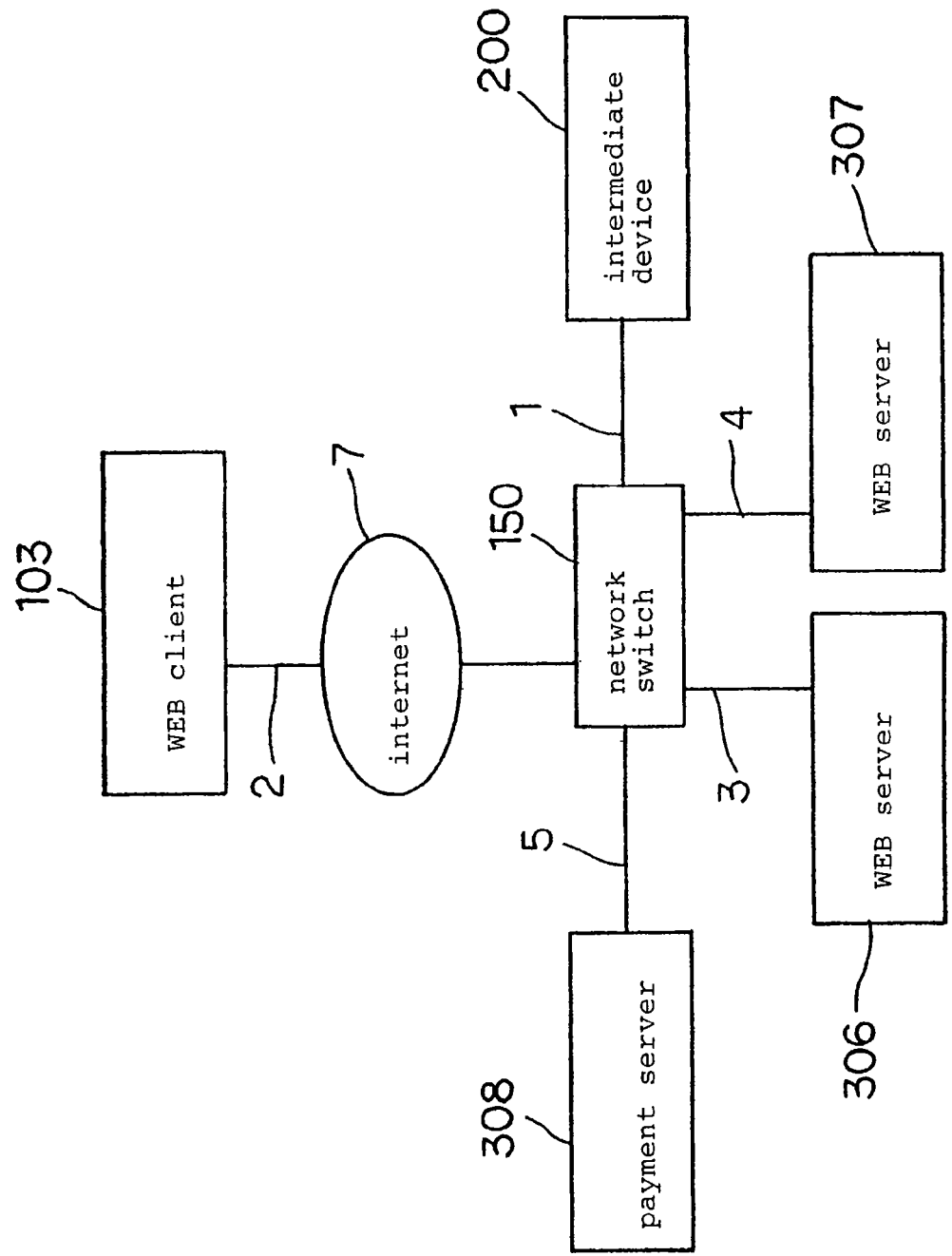
FIG. 10 is a block diagram showing an arrangement of a system according to a fourth embodiment of the present invention.

FIG. 10 is a block diagram showing an arrangement of a system according to a fourth embodiment of the present invention. The present system has intermediate device 200, at least two WEB servers 306, 307, payment server 308, at least one WEB client 103, and network switch 150.

WEB client 103 can access the server group shown in FIG. 10 from network 2 through Internet 7, and acquires WEB contents from the WEB servers and displays information.

WEB servers 306, 307 are connected to network switch 150 through networks 3, 4. WEB servers 306, 307 provide WEB contents up to the selection of goods in online shopping to WEB client 103, and manage information of WEB client 103 and selected good information in association with each other as one session. WEB servers 306, 307 then send the session information to payment server 308.

Payment server 308 is a WEB server connected to network switch 150 through network 5. Payment server 308 receives the session information from WEB servers 306, 307, and provides WEB contents for selecting a payment method and a delivery method for the goods to WEB client 103.

It is assumed that WEB client 103 does not perform a log-in process for identifying individuals and encrypted communications between itself and WEB servers 306, 307, and performs a log-in process and encrypted communications when it accesses payment server 308.

Network switch 150 and intermediate device 200 are the same as those shown in FIGS. 1 and 2.

When WEB client 103 accesses online shopping sites and selects goods in the above system, intermediate device 200 provides WEB client 103 with intermediate device providing services for integrating online shopping sites of WEB server 306 and WEB server 307 and allowing WEB client 103 to select goods in both the online shopping sites of WEB server 306 and WEB server 307.

It is also assumed that settings have been made in intermediate device 200 by the operator who runs online shopping sites, for integrating the online shopping sites of WEB server 306 and WEB server 307. For example, settings are made to add goods provided by WEB server 307 to goods selection pages provided by WEB server 306, and display information of the added goods.

(Introducing Procedure)

A procedure for introducing intermediate device 200 seamlessly in the networks between WEB client 103 and WEB server 306 in a situation wherein a session is established between WEB client 103 and WEB server 306 and WEB client 103 and WEB server 306 are communicating with each other will be described below.

It is assumed that WEB client 103 and WEB server 306 have established a session through networks 2, 3 connected to network 150 and have been communicating with each other. Then, network 1 of intermediate device 200 is connected to network switch 150.

In intermediate device 200, intermediate device providing service management unit 203 generates a list of information that is required to perform services (hereinafter referred to as "required information list") from service settings specified by the operator, and registers the required information list in session monitoring unit 204. The required information list includes session IDs and goods numbers. The session IDs are identifiers for identifying respective sessions in session information between WEB client 103 and WEB server 306. The goods numbers are numbers representing goods selected by the WEB client from the goods provided by WEB server 306.

After the required information list is determined, intermediate device 200 is newly connected to network switch 150. The system now takes on the physical arrangement shown in FIG. 10.

Network switch 150 has been set to transfer communication packets flowing between networks 2, 3 to network 1 of intermediate device 200, using the function to copy and transfer communication packets. When communication packets are transferred to intermediate device 200, data packets reach session monitoring unit 204 through network interface 201.

Session monitoring unit 204 analyzes session information transmitted in the existing session that has been established between client 100 and server 300, and extracts the session ID and the goods numbers of all goods selected by WEB client 103 from the session information, and sends the session ID and the goods numbers to intermediate device providing service management unit 203.

If all the ID and the goods numbers in the session that has been established prior to the introduction of the intermediate device can be acquired from the session information, then intermediate device providing service management unit 203 generates transfer rules for appropriately transferring communication packets from the acquired information and service settings specified by the operator, and registers the generated transfer rules in packet transfer control unit 202. The transfer rules are rules for integrating the WEB contents of WEB server 306 and WEB server 307 when WEB client 103 requests URL addresses of the WEB contents for displaying a list of goods. According to the transfer rules, when the WEB contents of WEB server 306 are requested, the WEB contents of the goods list of WEB server 307 are acquired and integrated with the contents of WEB server 306, and they are sent back as a single package of WEB contents to WEB client 103.

When the transfer rules are generated, the route of communication packets flowing on the session is changed from a route extending from WEB client 103 directly to WEB server 306 to a route extending from client WEB 103 through intermediate device 200 to WEB server 306. At this time, a process depending on the configurations of the networks connected to network switch 150, which are provided by changing settings of network switch 150 and changing the IP address of intermediate device 200 or WEB server 306, is employed.

When communication packets are routed through intermediate device 200, the communication packets that are sent on the session established between WEB client 103 and WEB server 306 go through network interface 201 to packet transfer control unit 202 in intermediate device 200. Intermediate device 200 establishes a new session between itself and WEB server 306, transfers data of communication packets sent from WEB client 103 using the newly established session, and maintains the session based on the session information acquired in advance so that the session established before intermediate device 200 is introduced will not be cut off.

Furthermore, intermediate device providing service management unit 203 newly adds transfer rules to packet transfer control unit 202 in order to match the session information between WEB client 103 and intermediate device 200 and the session information between intermediate device 200 and WEB server 306. The transfer rules refer to rules for using the session ID generated between WEB client 103 and WEB server 306 in the session between WEB client 103 and intermediate device 200 and performing a conversion between the session ID between intermediate device 200 and WEB client 103 and the session ID between intermediate device 200 and WEB server 306.

After all the sessions established before intermediate device 200 is introduced have started being routed through intermediate device 200 and the session between WEB client 103 and intermediate device 200 and the session between intermediate device 200 and WEB server 306 have been matched, intermediate device providing service management unit 203 instructs packet transfer control unit 202 to make the pre-registered transfer rules effective, starting the intermediate device providing services.

After the intermediate device providing services have started to be provided, when WEB client 103 requests WEB contents of a certain URL, intermediate device 200 establishes a new session between itself and WEB server 307 according to the transfer rules for contents integration, acquires desired WEB contents, also acquires WEB contents from WEB server 306, and integrate the acquired WEB contents. After intermediate device 200 describes information indicating that already selected goods have already been selected, in the WEB contents, intermediate device 200 sends the integrated WEB contents back to WEB client 103. At this time, the communication data are replaced between three sessions including sessions between WEB client 103 and intermediate device 200, between intermediate device 200 and WEB server 306, and between intermediate device 200 and WEB server 307, maintaining the sessions.

When WEB client 103 request a payment process, intermediate device 200 sends a payment request to WEB servers 306, 307, and receives session IDs and goods number information sent from WEB server 306 and WEB server 307 to payment server 308. Intermediate device 200 then transfers the session IDs of sessions established by the client prior to the introduction of the intermediate device, and goods numbers from WEB servers 306, 307 altogether to payment server 308. Intermediate device 200 sends WEB contents including URLs of WEB contents of payment server 308 back to WEB client 103.

Intermediate device 200 does not take part in communications between payment server 308 and WEB client 103.

The invention claimed is:

1. An intermediate device adapted to be provided between a first information processing device for providing an information processing service through a network and a second information processing device for receiving said information processing service, providing an intermediate service additional to said information processing service, said intermediate device comprising:

a state information acquirer that acquires state information required to maintain the state of an existing session established between said first information processing device and said second information processing device for said information processing service by actively requesting and obtaining said state information from said first information processing device or said second information processing device;

an intermediate service manager that manages, based on said state information, transfer rules for applying said intermediate service to data of said information processing service which is sent and received between said first information processing device and said second information processing device, and transferring the data of said information processing service to which said intermediate service is applied; and a transfer controller that maintains the state of said existing session between said intermediate device and said second information processing device, establishing a new session between said intermediate device and said first information processing device, and transferring said data of said information processing service using said existing session and said new session, according to said transfer rules, wherein said state information acquirer has a session monitor that acquires session information inherent in said session sent and received between said first information processing device and said second information processing device, as part of said state information, wherein said state information acquirer has an information collector that acquires service inherent information inherent in said information processing service as part of said state information by inquiring at said first information processing device or said second information processing device, wherein said state information acquirer inquires at said first information processing device or said second information processing device about accessing data object identifying information assigned to identify respective accessing objects on said first information processing device, with respect to a plurality of said accessing objects, and extracts a regularity of a pattern that is common to a plurality of obtained items of said accessing data object identifying information, acquiring, as part of said service inherent information, a device identifier that identifies said first information processing device having said accessing objects, and wherein said state information acquirer has a cancellation controller that issues a command for temporarily nullifying and reestablishing said session to said first information processing device and said second information processing device, and acquires said state information in a process of reestablishing the session according to said command.

2. An intermediate device according to claim 1, wherein said transfer controller has an operation mode for transferring data of the existing session between said first information processing device and said second information processing device without the data of the information processing service being subjected to said intermediate service, and an operation mode that establishes sessions between the intermediate device and both said second information processing device and said first information processing device when a new requested session of said information processing service is requested to be established by said second information processing device, applying said intermediate service to the data of said information processing service using said sessions, and transferring said data of said information processing service.

3. An intermediate device according to claim 1, wherein said intermediate service has contents registered in advance by an operator.

4. An intermediate device according to claim 3, wherein said information processing service comprises a service for allowing said second information processing device to access a resource on said first information processing device, and said intermediate service comprises a service for changing the access from said second information processing device to the resource on said first information processing device to convert an access destination.

5. An intermediate device according to claim 3, wherein said information processing service comprises a service for allowing said second information processing device to access a WEB page on said first information processing device, and said intermediate service comprises a service for integrating said information processing services provided by a plurality of said first information processing devices and providing the integrated information processing services to said second information processing device.

6. An intermediate device according to claim 1, wherein when said intermediate service ends being provided, said transfer controller:
  when requested to newly establish a session of said information processing service from said second information processing device, transfers the data of said information processing service between said second information processing device and said first information processing device, establishing a session directly between said first information processing device and said second information processing device while exempting the data from said intermediate service; and
  with respect to said information processing service which has already been provided, continuously transfers the data of said information processing service to which said intermediate service is applied using a session between itself and said first information processing device and a session between itself and said second information processing device, until said second information processing device ends employing said information processing service.

7. A service providing method of providing an intermediate service additional to an information processing service with an intermediate device which is provided between a first information processing device for providing said information processing service through a network and a second information processing device receiving said information processing service, comprising:
  the first step of controlling said intermediate device provided between said first information processing device and said second information processing device to acquire state information required to maintain the state of an existing session established between said first information processing device and said second information processing device for said information processing service by actively requesting and obtaining said state information from said first information processing device or said second information processing device;
  the second step of controlling said intermediate device to generate, based on said state information, transfer rules for applying said intermediate service to data of said information processing service which is sent and received between said first information processing device and said second information processing device, and transferring the data of said information processing service to which said intermediate service is applied; and
  the third step of controlling said intermediate device to maintain the state of said existing session between said intermediate device and said second information processing device, establish a new session between said intermediate device and said first information processing device, and transfer said data of said information processing service using said existing session and said new session, according to said transfer rules,
  wherein in said first step, said intermediate device acquires session information inherent in said session sent and received between said first information processing device and said second information processing device, as part of said state information,
  wherein in said first step, said intermediate device acquires service inherent information inherent in said information processing service as part of said state information by inquiring at said first information processing device or said second information processing device,
  wherein said intermediate device inquires at said first information processing device or said second information processing device about accessing data object identifying information assigned to identify respective accessing objects on said first information processing device, with respect to a plurality of said accessing objects, and extracts a regularity of a pattern that is common to a plurality of obtained items of said accessing data object identifying information, thereby acquiring, as part of said service inherent information, a device identifier for identifying said first information processing device having said accessing objects, and
  wherein in said first step, said intermediate device issues a command for temporarily nullifying and reestablishing said session to said first information processing device and said second information processing device, and acquires said state information in a process of reestablishing the session.

8. A service providing method according to claim 7, wherein in said first step, when all said state information which is required cannot be acquired, said intermediate device transfers data of the existing session between said first information processing device and said second information processing device without the data of said information processing service being subjected to said intermediate service, and when a new requested session of said information processing service is requested to be established by said second information processing device, said intermediate device establishes sessions between the intermediate device and both said second information processing device and said first information processing device, applies said intermediate service to the data of said information processing service using said sessions, and transfers said data of said information processing service.

9. A service providing method according to claim 7, wherein said intermediate service has contents registered in advance in said intermediate device by an operator.

10. A service providing method according to claim 9, wherein said information processing service comprises a service for allowing said second information processing device to access a resource on said first information processing device, and said intermediate service comprises a service for changing the access from said second information processing device to the resource on said first information processing device to convert an access destination.

11. A service providing method according to claim 9, wherein said information processing service comprises a service for allowing said second information processing device to access a WEB page on said first information processing device, and said intermediate service comprises a service for integrating said information processing services provided by a plurality of said first information processing devices and providing the integrated information processing services to said second information processing device.

12. A service providing method according to claim 7, further comprising:
the fourth step of, when said intermediate service ends being provided and when requested to newly establish a session of said information processing service from said second information processing device, transferring the data of said information processing service between said second information processing device and said first information processing device, thereby establishing a session directly between said first information processing device and said second information processing device while exempting the data from said intermediate service; and
the fifth step of, with respect to said information processing service which has already been provided, continuously transferring the data of said information processing service to which said intermediate service is applied using a session between said intermediate device and said first information processing device and a session between said intermediate device and said second information processing device, until said second information processing device ends employing said information processing service.

13. A service providing program stored on a computer-readable media for providing an intermediate service additional to an information processing service executed by a computer on an intermediate device which is provided between a first information processing device for providing said information processing service through a network and a second information processing device receiving said information processing service, said program enabling said computer to perform:
a first process of controlling state information acquirer to acquire state information required to maintain the state of an existing session established between said first information processing device and said second information processing device for said information processing service by actively requesting and obtaining said state information from said first information processing device or said second information processing device;
a second process of controlling intermediate service manager to generate, based on said state information, transfer rules for applying said intermediate service to data of said information processing service which is sent and received between said first information processing device and said second information processing device, and transfer the data of said information processing service to which said intermediate service is applied; and
a third process of controlling transfer controller to maintain the state of said existing session between said intermediate device and said second information processing device, establish a new session between said intermediate device and said first information processing device, and transfer said data of said information processing service using said existing session and said new session, according to said transfer rules,
wherein in said first process, session information inherent in said session sent and received between said first information processing device and said second information processing device is acquired as part of said state information,
wherein in said first process, service inherent information inherent in said information processing service is acquired as part of said state information by inquiring at said first information processing device or said second information processing device,
wherein said first information processing device or said second information processing device are inquired at about accessing data object identifying information assigned to identify respective accessing objects on said first information processing device, with respect to a plurality of said accessing objects, and a regularity of a pattern that is common to a plurality of obtained items of said accessing data object identifying information are extracted, thereby acquiring, as part of said service inherent information, a device identifier for identifying said first information processing device having said accessing objects, and
wherein in said first process, cancellation controller issues a command for temporarily nullifying and reestablishing said session to said first information processing device and said second information processing device, and said state information acquirer acquires said state information in a process of reestablishing the session.

14. A service providing program according to claim 13, wherein in said first process, when all said state information which is required cannot be acquired, said transfer controller transfers data of the existing session between said first information processing device and said second information processing device without the data of said information processing service being subjected to said intermediate service, and when a new requested session of said information processing service is requested to be established by said second information processing device, said transfer controller establishes sessions between the transfer controller and both said second information processing device and said first information processing device, applies said intermediate service to the data of said information processing service using said sessions, and transfers said data of said information processing service.

15. A service providing program according to claim 13, wherein said intermediate service has contents registered in advance in said intermediate device by an operator.

16. A service providing program according to claim 15, wherein said information processing service comprises a service for allowing said second information processing device to access a resource on said first information processing device, and said intermediate service comprises a service for changing the access from said second information processing device to the resource on said first information processing device to convert an access destination.

17. A service providing program according to claim 15, wherein said information processing service comprises a service for allowing said second information processing device to access a WEB page on said first information processing device, and said intermediate service comprises a service for integrating said information processing services provided by a plurality of said first information processing devices and providing the integrated information processing services to said second information processing device.

18. A service providing program according to claim 13, further comprising:
a fourth process of, when said intermediate service ends being provided and when requested to newly establish a session of said information processing service from said second information processing device, controlling said transfer controller to transfer the data of said information processing service between said second information processing device and said first information processing device, establishing a session directly between said first information processing device and said second information processing device while exempting the data from said intermediate service; and a fifth process of, with respect to said information processing service which has already been provided, controlling said transfer controller to continuously transfer the data of said information processing service to which said intermediate service is applied using a session between itself and said first information processing device and a session between itself and said second information processing device, until said second information processing device ends employing said information processing service.

19. A service providing program stored on a computer-readable media for being executed by a computer on an intermediate device to provide an intermediate service additional to an information processing service between a first information processing device for providing said information processing service through a network and a second information processing device receiving said information processing service, said program enabling said computer to perform:

a first process of acquiring state information required to maintain the state of an existing session established between said first information processing device and said second information processing device for said information processing service by actively requesting and obtaining said state information from said first information processing device or said second information processing device;

a second process of generating, based on said state information, transfer rules for applying said intermediate service to data of said information processing service which is sent and received between said first information processing device and said second information processing device, and transferring the data of said information processing service to which said intermediate service is applied;

a third process of maintaining the state of said existing session between said intermediate device and said second information processing device, establishing a new session between said intermediate device and said first information processing device, and transferring said data of said information processing service using said existing session and said new session, according to said transfer rules, wherein in said first process, session information inherent in said session sent and received between said first information processing device and said second information processing device is acquired as part of said state information, wherein in said first process, service inherent information inherent in said information processing service is acquired as part of said state information by inquiring at said first information processing device or said second information processing device, wherein said first information processing device or said second information processing device are inquired at about accessing data object identifying information assigned to identify respective accessing objects on said first information processing device, with respect to a plurality of said accessing objects, and a regularity of a pattern that is common to a plurality of obtained items of said accessing data object identifying information are extracted, thereby acquiring, as part of said service inherent information, a device identifier for identifying said first information processing device having said accessing objects, and wherein in said first process, cancellation controller issues a command for temporarily nullifying and reestablishing said session to said first information processing device and said second information processing device, and said state information acquirer acquires said state information in a process of reestablishing the session.

20. An intermediate device adapted to be provided between a first information processing device for providing an information processing service through a network and a second information processing device for receiving said information processing service, providing an intermediate service additional to said information processing service, said intermediate device comprising:

state information acquiring means for acquiring state information required to maintain the state of an existing session established between said first information processing device and said second information processing device for said information processing service by actively requesting and obtaining said state information from said first information processing device or said second information processing device;

intermediate service managing means for generating, based on said state information, transfer rules for applying said intermediate service to data of said information processing service which is sent and received between said first information processing device and said second information processing device, and transferring the data of said information processing service to which said intermediate service is applied; and transfer control means for maintaining the state of said existing session between said intermediate device and said second information processing device, establishing a new session between said intermediate device and said first information processing device, and transferring said data of said information processing service using said existing session and said new session, according to said transfer rules, wherein said state information acquiring means has a session monitor that acquires session information inherent in said session sent and received between said first information processing device and said second information processing device, as part of said state information, wherein said state information acquiring means has an information collector that acquires service inherent information inherent in said information processing service as part of said state information by inquiring at said first information processing device or said second information processing device, wherein said state information acquiring means inquires at said first information processing device or said second information processing device about accessing data object identifying information assigned to identify respective accessing objects on said first information processing device, with respect to a plurality of said accessing objects, and extracts a regularity of a pattern that is common to a plurality of obtained items of said accessing data object identifying information, acquiring, as part of said service inherent information, a device identifier that identifies said first information processing device having said accessing objects, and wherein said state information acquiring means has a cancellation controller that issues a command for temporarily nullifying and reestablishing said session to said first information processing device and said second information processing device, and acquires said state information in a process of reestablishing the session according to said command.

21. A service providing method of providing an intermediate service additional to an information processing service with an intermediate device which is provided between a first information processing device for providing said information processing service through a network and a second information processing device receiving said information processing service, comprising:

the first step of controlling said intermediate device provided between said first information processing device and said second information processing device to acquire state information required to maintain the state of an existing session established between said first information processing device and said second information processing device for said information processing service by actively requesting and obtaining said state information from said first information processing device or said second information processing device;

the second step of controlling said intermediate device to generate, based on said state information, transfer rules for applying said intermediate service to data of said information processing service which is sent and received between said first information processing device and said second information processing device, and transferring the data of said information processing service to which said intermediate service is applied; and the third step of controlling said intermediate device to maintain the state of said existing session between said intermediate device and said second information processing device, establish a new session between said intermediate device and said first information processing device, and transfer said data of said information processing service using said existing session and said new session, according to said transfer rules, wherein in said first step, session information inherent in said session sent and received between said first information processing device and said second information processing device is acquired as part of said state information, wherein in said first step, service inherent information inherent in said information processing service is acquired as part of said state information by inquiring at said first information processing device or said second information processing device, wherein said first information processing device or said second information processing device are inquired at about accessing data object identifying information assigned to identify respective accessing objects on said first information processing device, with respect to a plurality of said accessing objects, and a regularity of a pattern that is common to a plurality of obtained items of said accessing data object identifying information are extracted, thereby acquiring, as part of said service inherent information, a device identifier for identifying said first information processing device having said accessing objects, and wherein in said first step, cancellation controller issues a command for temporarily nullifying and reestablishing said session to said first information processing device and said second information processing device, and said state information acquirer acquires said state information in a process of reestablishing the session.

22. A service providing program stored on a computer-readable media for providing an intermediate service additional to an information processing service executed by a computer on an intermediate device which is provided between a first information processing device for providing said information processing service through a network and a second information processing device receiving said information processing service, said program enabling said computer to perform:

a first process of controlling state information acquiring means to acquire state information required to maintain the state of an existing session established between said first information processing device and said second information processing device for said information processing service by actively requesting and obtaining said state information from said first information processing device or said second information processing device;

a second process of controlling intermediate service managing means to generate, based on said state information, transfer rules for applying said intermediate service to data of said information processing service which is sent and received between said first information processing device and said second information processing device, and transfer the data of said information processing service to which said intermediate service is applied; and a third process of controlling transfer control means to maintain the state of said existing session between said intermediate device and said second information processing device, establish a new session between said intermediate device and said first information processing device, and transfer said data of said information processing service using said existing session and said new session, according to said transfer rules, wherein in said first process, session information inherent in said session sent and received between said first information processing device and said second information processing device is acquired as part of said state information, wherein said first process, service inherent information inherent in said information processing service is acquired as part of said state information by inquiring at said first information processing device or said second information processing device, wherein said first information processing device or said second information processing device are inquired at about accessing data object identifying information assigned to identify respective accessing objects on said first information processing device, with respect to a plurality of said accessing objects, and a regularity of a pattern that is common to a plurality of obtained items of said accessing data object identifying information are extracted, thereby acquiring, as part of said service inherent information, a device identifier for identifying said first information processing device having said accessing objects, and wherein in said first process, cancellation controller issues a command for temporarily nullifying and reestablishing said session to said first information processing device and said second information processing device, and said state information acquirer acquires said state information in a process of reestablishing the session.

23. A service providing program stored on a computer-readable media for being executed by a computer on an intermediate device to provide an intermediate service additional to an information processing service between a first information processing device for providing said information processing service through a network and a second information processing device receiving said information processing service, said program enabling said computer to perform:

- a first process of acquiring state information required to maintain the state of an existing session established between said first information processing device and said second information processing device for said information processing service by actively requesting and obtaining said state information from said first information processing device or said second information processing device;
- a second process of generating, based on said state information, transfer rules for applying said intermediate service to data of said information processing service which is sent and received between said first information processing device and said second information processing device, and transferring the data of said information processing service to which said intermediate service is applied;
- a third process of maintaining the state of said existing session between said intermediate device and said second information processing device, establishing a new session between said intermediate device and said first information processing device, and transferring said data of said information processing service using said existing session and said new session, according to said transfer rules,
- wherein in said first process, session information inherent in said session sent and received between said first information processing device and said second information processing device is acquired as part of said state information,
- wherein in said first process, service inherent information inherent in said information processing service is acquired as part of said state information by inquiring at said first information processing device or said second information processing device,
- wherein said first information processing device or said second information processing device are inquired at about accessing data object identifying information assigned to identify respective accessing objects on said first information processing device, with respect to a plurality of said accessing objects, and a regularity of a pattern that is common to a plurality of obtained items of said accessing data object identifying information are extracted, thereby acquiring, as part of said service inherent information, a device identifier for identifying said first information processing device having said accessing objects, and
- wherein in said first process, cancellation controller issues a command for temporarily nullifying and reestablishing said session to said first information processing device and said second information processing device, and said state information acquirer acquires said state information in a process of reestablishing the session.

* * * * *